United States Patent
Lamas-Linares et al.

(10) Patent No.: US 11,575,456 B2
(45) Date of Patent: Feb. 7, 2023

(54) QUANTUM SECURE NETWORK CLOCK SYNCHRONIZATION

(71) Applicant: Xairos Systems, Inc., Lone Tree, CO (US)

(72) Inventors: Antia Lamas-Linares, Lone Tree, CO (US); W. Cyrus Proctor, Lone Tree, CO (US)

(73) Assignee: Xairos Systems, Inc., Lone Tree, CO (US)

(*) Notice: Subject to any disclaimer, the term of this patent is extended or adjusted under 35 U.S.C. 154(b) by 50 days.

(21) Appl. No.: 17/348,585

(22) Filed: Jun. 15, 2021

(65) Prior Publication Data

US 2021/0391939 A1 Dec. 16, 2021

Related U.S. Application Data

(60) Provisional application No. 63/039,363, filed on Jun. 15, 2020.

(51) Int. Cl.
*H04J 3/06* (2006.01)
*H04B 10/70* (2013.01)
*H04L 9/40* (2022.01)

(52) U.S. Cl.
CPC ............ *H04J 3/0679* (2013.01); *H04B 10/70* (2013.01); *H04J 3/0638* (2013.01); *H04J 3/0682* (2013.01); *H04L 63/145* (2013.01)

(58) Field of Classification Search
CPC ........ G06N 10/00; H04B 10/27; H04B 10/50; H04B 10/6151; H04B 10/70; H04B 1/7073; H04B 1/7183; H04B 7/2675; H04B 7/2678; H04J 3/06; H04J 3/0635; H04J 3/0638; H04J 3/0685; H04J 3/0679; H04J 3/0682; H04L 7/0075; H04L 9/0662; H04L 9/0852; H04L 9/12; H04L 9/3297; H04L 27/2655; H04L 63/1416; H04L 63/1425; H04L 63/145; H04W 56/001

See application file for complete search history.

(56) References Cited

U.S. PATENT DOCUMENTS

| | | | |
|---|---|---|---|
| 7,286,444 B1 | 10/2007 | Bahder et al. | |
| 7,525,712 B2 | 4/2009 | Wen et al. | |
| 7,684,015 B2 | 3/2010 | Shih | |

(Continued)

OTHER PUBLICATIONS

Lorunser et al., Timing Synchronization with Photon Pairs for Quantum Communications, IEEE, 1 page. 2013.*

(Continued)

*Primary Examiner* — Frank Duong
(74) *Attorney, Agent, or Firm* — Neugeboren O'Dowd PC

(57) ABSTRACT

A multi-node, quantum communication network for providing quantum-secure time transfer with Damon attack detection is described. The network includes three or more nodes connected via authenticated communication channels forming a closed loop. By determining differences between the local times at as well as the time durations required for photons to travel between the three or more nodes, the network detects a Damon attack, if present. For example, the network imposes a closed loop condition to detect the Damon attack. The network can also use the local time differences and time durations for photon travel between nodes to synchronize the local clocks at the three or more nodes of the network.

7 Claims, 5 Drawing Sheets

(56) References Cited

U.S. PATENT DOCUMENTS

| | | | |
|---|---|---|---|
| 10,623,173 | B1* | 4/2020 | Geng .................. H03L 7/087 |
| 2007/0070501 | A1 | 3/2007 | Wen et al. |
| 2016/0234017 | A1 | 8/2016 | Englund et al. |
| 2017/0317814 | A1 | 11/2017 | Grice et al. |
| 2018/0241553 | A1 | 8/2018 | Lucamarini et al. |
| 2018/0294946 | A1 | 10/2018 | Sinclair et al. |
| 2018/0351738 | A1 | 12/2018 | Grice |
| 2020/0084033 | A1 | 3/2020 | Lamas-Linares et al. |
| 2021/0105135 | A1* | 4/2021 | Figueroa ............ H04L 9/0858 |

OTHER PUBLICATIONS

Ullah et al., Quantum frequency synchronization of distant clock oscillators, Springer, 19 pages, Mar. 18, 2020.*

Duan et al., A survey on quantum positioning system, International Journal of Modelling and Simulation, 19 pages, 2020.*

Technical Report, Technical Report FG QIT4N D1.2 Quantum information technology for networks use cases: Network aspects of quantum information technologies, ITU-T, 68 pages, Nov. 24, 2021.*

International Searching Authority, PCT/US21/37497, ISR and WO, dated Oct. 1, 2021.

Bahder, Thomas B. et al., Clock Synchronization based on Second-Order Quantum Coherence of Entangled Photons, AIP Conference Proceedings 734, 395 (2004); https://doi.org/10.1063/1.1834461.

Bhatti, Jahshan et al., Hostile Control of Ships via False GPS Signals: Demonstration and Detection, Journal of the Institute of Navigation, vol. 64, No. 1, Spring 2017, pp. 51-66.

Chuang, Isaac L., Quantum Algorithm for Distributed Clock Synchronization, Physical Review Letters, vol. 85, No. 9, Aug. 20, 2000, pp. 2006-2009.

Dai, Hui et al., Towards satellite-based quantum-secure time transfer, Nature Physics, (2020) pp. 1-7, Springer Nature Limited; https://doi.org/10.1038/s41567-020-0892-y.

Eddington, A. S., The Mathematical Theory of Relativity, 2nd Edition (1924), Reviewed, The Mathematical Gazette, vol. 12, Issue 175 (2016), pp. 1-5.

Einstein, A., On the Electrodynamics of Moving Bodies, an English translation of Zur Elektrodynamik bewegter Korper publ. in Annalen der Physik 17:891, 1905, which appeared in the book the Principle of Relativity, publ. 1923 by Methuen and Co., Ltd., London; http://www.fourmilab.ch/, pp. 1-24.

Giovannetti, Vittorio, et al., Conveyor-belt clock synchronization, Physical Review A 70, 043808 (2004), pp. 1-8, pub. The American Physical Society.

Giovannetti, Vittorio, et al., Quantum-enhanced positioning and clock synchronization; Nature, vol. 412, Jul. 26, 2001, pp. 417-419, pub. Macmillan Magazines Ltd.

Hafezi, Mohammad, et al., Optomechanically induced non-reciprocity in microring resonators, Optics Express, vol. 20, No. 7, Mar. 26, 2012, pp. 7672-7684, pub. Optical Society of America.

Ho, Caleb et al., Clock synchronization by remote detection of correlated photon pairs, (2009), ArXiv:0901.3203v1 [quant-ph].

Ho, Caleb, et al., Clock synchronization by remote detection of correlated photon pairs, New J. Phys. 11 045011, (2009), pp. 1-14.

Hong, C. K., et al., Measurement of Subpicosecond Time Intervals between Two Photons by Interference, Physical Review Letters, vol. 59, No. 18, Nov. 2, 1987, pp. 2044 2046, pub. Am. Phys. Society.

Hou, Feiyan et al., Fiber-Optic quantum two-way time transfer with frequency entangled pulses, pp. 1-9, (2018) preprint, Optical Society of America.

Hou, Feiyan et al., Fiber-Optic two-way quantum time transfer with frequency-entangled pulses, (2019), pp. 1-10, arXiv:1812.10077V2 [quant-ph].

Hou, Feiyan et al., First Demonstration of nonlocal two-way quantum clock synchronization on fiber link, CLEO Pacific Rim, (2018), Th4J.3.pdf, Optical Society of America.

Hou, Feiyan et al., Quantum-enhanced two-way time transfer, QIM, (2017), QF3A.4 pdf, pp. 1-3, Optical Society of America.

Ilo-Okeke, Ebubechukwu, et al., Remote quantum clock synchronization without synchronized clocks, npj Quantum Information (2018) 4:40, pp. 1-6, doi: 10.1038/341534-018-0090-2.

Imoto, N. et al., Quantum nondemolition measurement of the photon number via the optical Kerr effect, Physical Review A, vol. 32, No. 4, Oct. 1985, pp. 2287-2292, Am Phys Society.

Jozsa, Richard et al., Quantum Clock Synchronization Based on Shared Prior Entanglement, Physical Review Letters, vol. 85, No. 9, Aug. 28, 2000, pp. 2010-2013, Am. Phys. Society.

Kerns, Andrew J. et al., Unmanned Aircraft Capture and Control via GPS Spoofing, J. Field Robotics 31(4), pp. 617-636, (2014), Wiley Periodicals, Inc.

Lamas-Linares, Antia et al., Secure quantum clock synchronization, Proc. SPIE, vol. 10547, (Feb. 22, 2018), pp. 1-9.

Lee, Jianwei et al., Asymmetric delay attack on an entanglement-based bidirectional clock synchronization protocol, (2019), pp. 1-6, arXiv:1907.09661 v1 [quant-ph].

Lee, Jianwei et al., Symmetrical clock synchronization with time-correlated photon pairs, (2018), pp. 1-5, arXiv:1812.08450v1 [quan-ph].

Lenferink, Erik J. et al., Coherent optical non-reciprocity in axisymmetric resonators, Optics Express, vol. 22, No. 13, Jun. 30, 2014, pp. 16099-16111, Optical Society of America.

Levine, Judah, Introduction to time and frequency metrology, Review of Scientific Instruments, vol. 70, No. 6, (1999), pp. 2567-2596; https://doi.org/10.1063/1.1149844.

Ling, Alexander et al., Experimental quantum key distribution based on a Bell test, Physical Review A 78, 020301(R), (2008), pp. 1-4, Am. Phys. Society.

Manzalini, Antonio, Quantum Communications in Future Networks and Services, Quantum Rep. 2020, 2, pp. 221-232.

Marcikic, Ivan et al., Free-space quantum key distribution with entangled photons, Appl. Phys. Lett. 89, 101122 (2006), pp. 1-4; https://doi.org/10.1063/1.2348775.

Narula, Lakshay et al., Requirements for Secure Clock Synchronization, IEEE Journal of Selected Topics in Signal Processing, vol. 12, No. 4, Aug. 2018, pp. 749-762.

Pirandola, Stefano, End-to-end capacities of a quantum communication network; Communications Physics, (2019) 2:51.

Quan, Runai et al., Demonstration of quantum synchronization based on second-order quantum coherence of entangled photons, Sci. Rep.6, 30453 (2016), pp. 1-8; DOI:10.1038/srep30453.

Quan, Runai et al., Nonlocal temporal correlation identification of entangled photon pairs for quantum clock synchronization, pp. 1-10, 1907.08925.

Reiserer, Andreas et al., Nondestructive Detection of an Optical Photon, Science, vol. 342, Dec. 13, 2013, pp. 1349-1351.

Shen, Zhen et al., Experimental realization of optomechanically induced non-reciprocity, Nature Photonics, vol. 10, Oct. 2016, pp. 657-662.

Shepard, Daniel P. et al., Evaluation of the vulnerability of phasor measurement units to GPS spoofing attacks, Int. J. Crit. Infrastructure Protection, vol. 5, (2012), pp. 146-153.

Sobel, Dava, Longitude: the true story of a lone genius who solved the greatest scientific problem of his time, Walker (1995), abstract pp. 1-3.

Valencia, Alejandra et al., Distant clock synchronization using entangled photon pairs, Appl. Phys. Lett. 85, (2004), pp. 2655-2657; https://doi.org/10.1063/1.1797561.

Wengerowsky, Soren et al., Entanglement-based wavelength multiplexed quantum communication network, (2018), pp. 1-9, arXiv:1801.06194v1, [quant-ph].

Xiao, Yun-Feng et al., Quantum nondemolition measurement of photon number via optical Kerr effect in an ultra-high-Q microtoroid cavity, Optics Express, vol. 16, No. 26, Dec. 22, 2008, pp. 21462-21475.

* cited by examiner

QUANTUM SECURE NETWORK CLOCK SYNCHRONIZATION

CLAIM OF PRIORITY

The present application claims priority to U.S. Provisional Patent Application No. 63/039,363, entitled "Quantum Secure Network Clock Synchronization," filed Jun. 15, 2020, and incorporated by reference in its entirety.

FIELD OF THE INVENTION

The present invention relates to quantum communications and, more particularly, to quantum communication networks with three or more nodes.

BACKGROUND OF THE INVENTION

Quantum communications, namely secure optical communications enabled by the use of quantum properties of photons, are becoming more accepted and mainstream. While large scale fiber optic and free space optical implementations of quantum communications systems have been demonstrated, expanding point-to-point, two-node system to a multi-node network has been difficult to implement.

SUMMARY OF THE INVENTION

A multi-node, quantum communication network for providing quantum-secure time transfer with Damon attack detection is described, in accordance with an embodiment. The network includes three or more nodes connected via authenticated communication channels forming a closed loop. By determining differences between the local times at as well as the time durations required for photons to travel between the three or more nodes, the network detects a Damon attack, if present. For example, the network imposes a closed loop condition to detect the Damon attack. The network can also use the local time differences and time durations for photon travel between nodes to synchronize the local clocks at the three or more nodes of the network.

In accordance with another embodiment, a multi-node, quantum communication network for providing quantum-secure time transfer with Damon attack detection includes first, second, and third nodes. The first node includes a first local clock and a first photon pair source for providing a first entangled photon pair, the first entangled photon pair including first and second photons. The first node also includes a first capture device for capturing the first photon at a first local time t1 at the first local clock, and a first coupling mechanism for directing the second photon away from the first node. The first node further includes a first measuring device for receiving photons from outside the first node, and a first controller for controlling at least the first local clock, the first photon pair source, the first capture device, the first coupling mechanism, and the first measuring device. The second node includes a second local clock and a second photon pair source for providing a second entangled photon pair, the second entangled photon pair including third and fourth photons. The second node also includes a second capture device for capturing the third photon at a second local time t2 at the second local clock, and a second coupling mechanism for directing the fourth photon away from the second node. The second node further includes a second measuring device for receiving photons from outside the second node, and a second controller for controlling at least the second local clock, the second photon pair source, the second capture device, the second coupling mechanism, and the second measuring device. The third node includes a third local clock and a third photon pair source for providing a third entangled photon pair, the third entangled photon pair including fifth and sixth photons. The third node also includes a third capture device for capturing the fifth photon at a third local time t3 at the third local clock, and a third coupling mechanism for directing the sixth photon away from the third node. The third node additionally includes a third measuring device for receiving photons from outside the third node, and a third controller for controlling at least the third local clock, the third photon pair source, the third capture device, the third coupling mechanism, and the third measuring device. The network further includes a first authenticated communication channel communicatively connecting the first and second nodes, a second authenticated communication channel communicatively connecting the second and third nodes, and a third authenticated communication channel communicatively connecting the third and first nodes. The first, second, and third nodes and the first, second, and third authenticated communication channels form a closed loop. The first, second, and third controllers are configured for determining differences between the first, second, and third local times, as well as for measuring time durations required for the second photon to travel from the first node to the second node, for the second photon to travel from the first node to the third node, for the fourth photon to travel from the second node to the first node, for the fourth photon to travel from the second node to the third node, for the sixth photon to travel from the third node to the first node, and for the sixth photon to travel from the third node to the second node. The first, second, and third controllers are also configured for using the differences between the first, second, and third local times and the time durations so measured to detect a Damon attack, if present.

In accordance with a further embodiment, the first, second, and third controllers are further configured to detect the Damon attack if a closed loop condition is not satisfied. In an embodiment, the closed loop condition is defined as $\delta_{12}+\delta_{23}+\delta_{31}=0$, wherein $t_1$ is the local time of at the first node, $t_2$ is the local time of at the second node, and $t_3$ is the local time of at the third node, $\delta_{12}=t_1-t_2$, $\delta_{23}=t_2-t_3$, and $\delta_{31}=t_3-t_1$.

In another embodiment, the first, second, and third photon pair sources are configured for generating polarization-entangled photon pairs.

In a still further embodiment, the differences between the first, second, and third local times and the time durations so measured are used for synchronizing the first, second, and third local clocks.

In accordance with another embodiment, a method for determining presence of a Damon attack in a multi-node quantum communication network for providing quantum-secure time transfer is described. The method includes identifying a closed loop formed by at least three nodes within the network, and determining differences between local clocks of the at least three nodes. The method further includes imposing a closed loop condition on the differences so determined, and detecting, if the closed loop condition is not satisfied by the differences so determined, presence of the Damon attack.

In a further embodiment, the method includes, at each one of the at least three nodes, generating an entangled photon pair, the entangled photon pair including a first photon and a second photon entangled with the first photon, and capturing the first photon at a local time for the one of the at least three nodes. The method further includes measuring a travel time for the second photon to travel from the one of the at least three nodes to another one of the at least three nodes, calculating a difference in local time from the one of the at least three nodes to another one of the at least three nodes, and determining whether the local clock at each one of the at least three nodes is synchronized with another one of the at least three nodes

DETAILED DESCRIPTION OF EMBODIMENTS OF THE INVENTION

Figure 1:
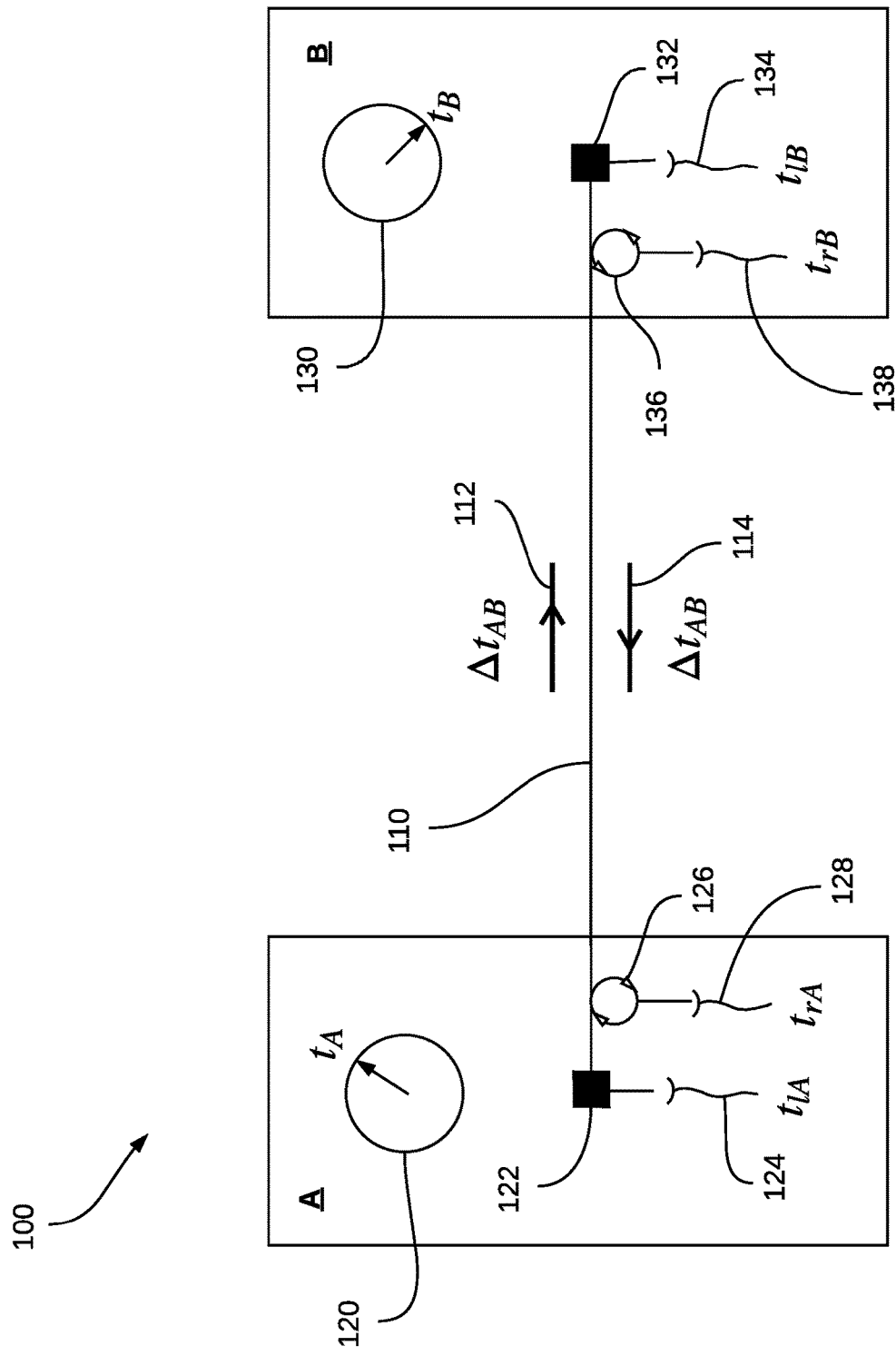
FIG. 1 illustrates a two-node quantum communication system.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present. Likewise, when light is received or provided "from" one element, it can be received or provided directly from that element or from an intervening element. On the other hand, when light is received or provided "directly from" one element, there are no intervening elements present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

While certain aspects of quantum communications, such as reliable production of entangled photons, have been reliably demonstrated, certain other aspects are still difficult. One example is the need for clock synchronization and syntonization over multiple nodes of a quantum communications network. For instance, clock synchronization for a two-node quantum network has been described in US Pat. Pub. No. 2020/0084033 A1 entitled "Quantum Secure Clock Synchronization Based on Time-Energy and Polarization Entangled Photon Pairs" to Lamas-Linares, et al. While this patent application describes ways to securely synchronize the clocks at two nodes, it does not discuss expanding the concept to larger networks with multiple nodes without separately establishing node-to-node time transfer for every node combination. That is, while previously described methods discuss the synchronization of clocks between two nodes, they are absent disclosure regarding the synchronization of clocks across a network of three or more nodes without treating the network as a cluster of two-node networks.

For example, FIG. 1 shows a two-node network 100 including nodes A and B, connected by a bi-directional link (quantum channel) 110. The length of quantum channel 110 may or may not be known. Propagation time for a photon to travel from node A to node B (indicated by an arrow 112) is $\Delta t_{AB}$, and propagation time for a photon to travel from node B to node A (indicated by an arrow 114) is $\Delta t_{BA}$. Within each node, there is a local clock (120 and 130 in nodes A and B, respectively) for keeping the local time at the node ($t_A$ and $t_B$ in nodes A and B, respectively) and operating at a set frequency ($f_A$ and $f_B$ at nodes A and B, respectively). For this initial discussion, we assume $f_A=f_B$. The time labels $t_A$ and $t_B$ is assumed to have an unknown relationship to each other, and the relationship between local clocks 120 and 130 is not known. The time difference if local clocks 120 and 130 are placed together in the same location can be expressed as:

$$\delta_{AB}=t_A-t_B \quad [\text{Eq. 1}]$$

$$\delta_{BA}=t_B-t_A=-\delta_{AB} \quad [\text{Eq. 2}]$$

Continuing to refer to FIG. 1, an entangled photon pair source (122 and 132 in nodes A and B, respectively) produces polarization entangled photon pairs by, for example, spontaneous parametric down-conversion (SPDC) or a similar method. One photon from each photon pair is detected locally by a first detector (124 and 134 in nodes A and B, respectively) and assigned a local time ($t_{lA}$ and $t_{lB}$ at nodes A and B, respectively). The other photon from each photon pair is sent over quantum channel 110 toward the other node, separated by a circulator (e.g., polarization maintaining circulators 126 and 136 in nodes A and B, respectively), detected by a second detector (128 and 138 in nodes A and B, respectively), and time tagged according to the clock at the receiving node ($t_{rA}$ and $t_{rB}$ at nodes A and B, respectively). This process of detection and time tagging is referred to as a measurement, and involves a projection of the polarization state and destruction of that photon by the detector.

The photons in each photon pair exhibits a relationship between the time labels assigned locally by the producing node and the remote node. This relationship depends on the intrinsic clock difference and the propagation time between the producing node and the remote node. For any given photon pair i produced in node A, this relationship can be expressed as:

$$t_{lA}^i-t_{rB}^i=\delta_{AB}+\Delta t_{AB} \quad [\text{Eq. 3}]$$

An efficient way to obtain $t_{lA}^i-t_{rB}^i$ for all produced photon pairs is to calculate a cross correlation over all time labels corresponding to photons produced at node A. The maximum value of that cross correlation $\tau_{AB}$ can be expressed as:

$$\tau_{AB}=\delta_{AB}+\Delta t_{AB} \quad [\text{Eq. 4}]$$

Similarly, for photon pairs originating from node B, the maximum value of the cross correlation $\tau_{BA}$ can be expressed as:

$$\tau_{BA}=\delta_{BA}+\Delta t_{BA} \quad [\text{Eq. 5}]$$

It is noted that that there is no guarantee, in principle, that $\Delta t_{AB}=\Delta t_{BA}$. However, when an optical fiber or free space single mode optical channel is used as quantum channel 110, it is assumed that the photons traveling in directions 112 and 114 are essentially identical except for their propagation directions. Thus, it is assumed in this example that $\Delta t_{AB}=\Delta t_{BA}$ for simplicity. Thus, the time difference $\delta_{AB}$ can be expressed as:

$$\delta_{AB}=\tfrac{1}{2}(\tau_{AB}-\tau_{BA}) \quad [\text{Eq. 6}]$$

Then the round-trip time, regardless of the symmetry of quantum channel 110, can be expressed as:

$$R_{AB}=\tau_{AB}+\tau_{BA} \quad [\text{Eq. 7}]$$

Using the known relationships established in the equations above, the time relationships between the two local clocks 120 and 130 in nodes A and B, respectively, can be extracted in order to synchronize the two local clocks. Clock synchronization is essential for quantum communications (and other communications infrastructures) because relative time readings between even atomic clocks can drift within a short time frame, and disruption in the time transfer is one indicator of an adversary attack on the quantum channel. Thus, time transfer between nodes of the quantum communication network in a secure, non-spoofable manner is essential for ensuring security of the overall data transfer. In other words, any two nodes in the network can be synchronized in time in a quantum-secure manner with the additional assumption that the channel connecting the nodes is symmetric in time for the propagation of photons that are produced at random times and which are identical in their properties except the direction of propagation. If a malicious party ("Damon") gains control of the degree of asymmetry in the quantum channel, he can use that to manipulate the measured offset between two nodes. Regardless, in a two-node network, the ability of the malicious party to manipulate the symmetry of a single channel compromises the security of the procedure and the network operator can be alerted of the intrusion.

However, the discussion above is limited to a two-node network. In order to expand to a quantum communication network including more than two nodes using the above approach, the assumptions and calculations must be repeated for each pair of nodes within the network (i.e., pairwise synchronization). That is, direct application of the above approach for time transfer to a multi-node network beyond two nodes is non-trivial.

It is recognized herein that, with the appropriate set of adjustments to the operation and functionality of the hardware at each node, time transfer among multiple nodes within a quantum communication network can be greatly simplified in a secure, non-spoofable manner.

A multi-node, quantum communication network is described. The network includes three or more nodes connected via quantum channels and configured such that quantum-secure time transfer across all nodes in the network is enabled. The network also is configured for providing synchronization and syntonization of local clocks at the three or more nodes. A method of operating a multi-mode, quantum communication network with quantum-secure time transfer is also described.

In particular, the present disclosure provides quantum-secure clock synchronization and syntonization hardware and procedure for secure time transfer between clocks in a network of three or more nodes. Each of the nodes in this network contains:

- A local clock with initially unknown offset with respect to other clocks in the network (e.g., local clock 120 in FIG. 1)
- A source of polarization-entangled photon pairs with high intrinsic time correlations based on, for example, SPDC (e.g., source 122)
- A capture device for one of the down-conversion modes that contains one member of the entangled photon pair (e.g., first detector 124)
- A coupling mechanism for the other member of the entangled photon pair to be introduced into a single optical mode connecting the producing node to another, receiving node (e.g., quantum channel 110)
- A measuring device connected to the incoming signal from the quantum channel. (e.g., circulator 126 and second detector 128)
- Authenticated communications channel between each member of the node and the rest of the network (sometimes referred to as a classical channel, and can simultaneously function as the quantum channel, mentioned above).
- A controller configured for managing the above components for each node to enable secure time-transfer throughout the multi-node network (e.g., controller 220 in FIG. 2)

Figure 2:
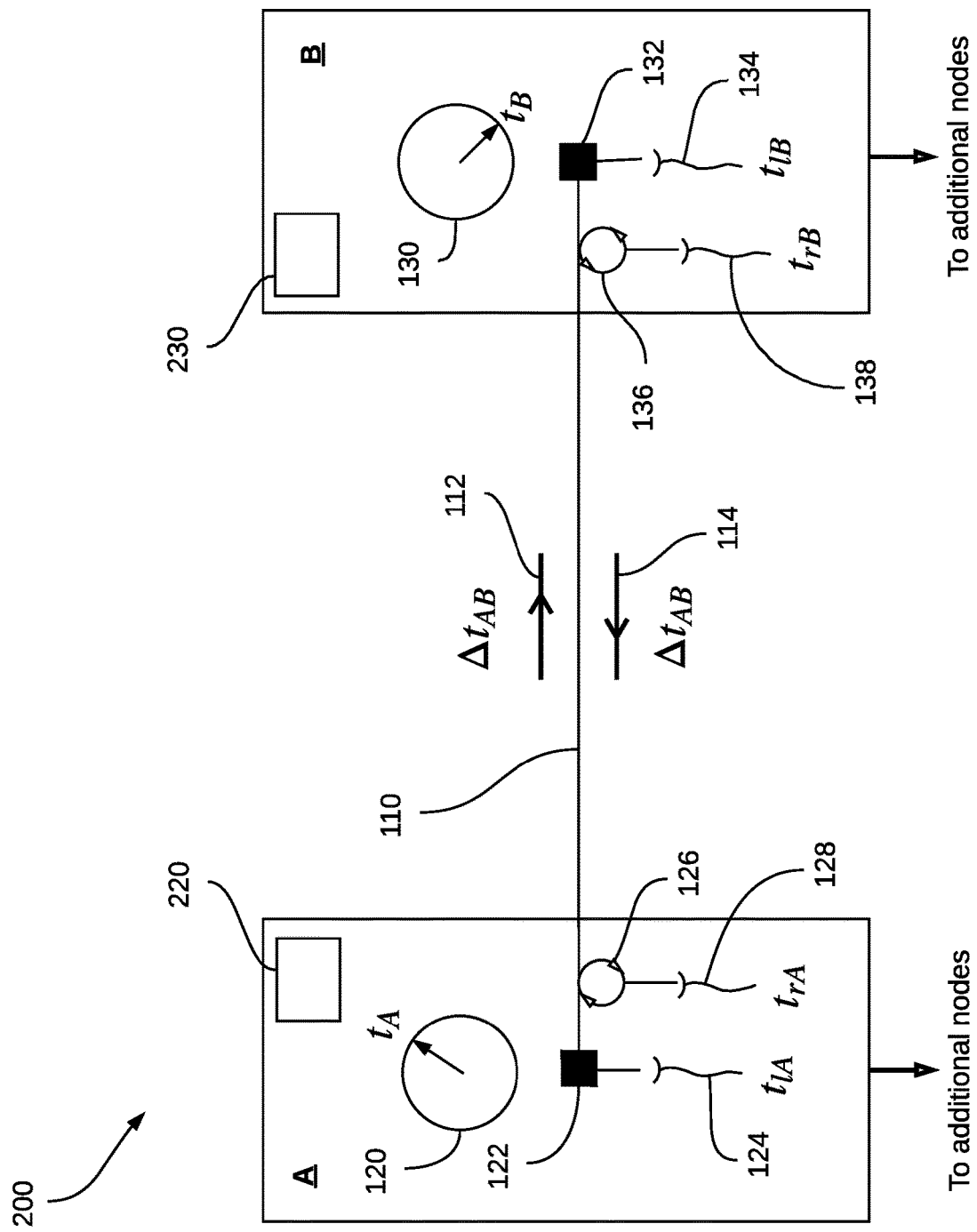
FIG. 2 illustrates two nodes of a quantum communication system enabling secure time transfer over multiple nodes, in accordance with an embodiment.

The various components of a node in a network is illustrated in FIG. 2. As shown in FIG. 2, a network portion 200 includes two nodes A and B, each of which includes, in addition to the two-node network shown in FIG. 1, a controller (e.g., controllers 220 and 230 in nodes A and B, respectively) and connections to additional nodes. Controllers 220 and 230 provide additional functionalities to enable the quantum-secure time transfer between the various nodes within the network.

In a multi-node network, pairwise synchronization procedures between any two nodes in the network, such as described above, can provide a set of relationships between the possible channel manipulations that Damon can perform before introducing inconsistencies derived from a set of additional constraints that arise from the network topology. In non-mathematical terms, it is recognized herein that these constraints imply that Damon must simultaneously control different sections of the overall network and introduce equal magnitude and opposite sign asymmetries in different channels. It is further recognized herein that the detailed mathematical structure also illustrates that not all pairwise exchanges are necessary for ensuring secure time transfer throughout the multi-node network, thus providing a constructive recipe for determining a minimum number of pairwise exchanges, thus determining a useful and optimal network topology and system structure.

In the network configurations described below, the constraints introduced by the network topology are available to all nodes via the authenticated communication channel and can be constantly monitored for consistency. Any inconsistency in the monitored values related to these constraints can result in a modification of the derived confidence level of the time transfer procedure. The topology conditions can also be augmented by any additional knowledge about the network channels and the laws of physics. For example, for two non-moving, stationary nodes based on Earth where their relative distance is known, it is a safe assumption that the minimum propagation time between the nodes is equal to or larger than that of the speed of light in vacuum, and all propagation times should be larger than zero, among other assumptions. For links between nodes in a space environment, the link itself can be remotely monitored for attempts at interference and thus be assumed to be same for symmetry breaking attacks, which may be quite elaborate. In a dynamic network where nodes are added and withdrawn ad hoc during the lifetime of the network, the constraints on the manipulations of a Damon attack change with the changes in topology and propagate throughout the network, thus introducing yet another difficulty for successful hacking.

Furthermore, in the network configuration described below, the authenticity of the timing signal itself (i.e., the entangled photons being exchanged) can be guaranteed by the ability of the sending and receiving nodes to perform a Bell inequality analysis on the photon pairs. Due to the no-cloning theorem of quantum mechanics and the monogamy of entanglement, it is essentially impossible for a Damon attack by fabrication (i.e., spoofing) of the timing signal and manipulate the synchronization process in this way. In other words, the disclosure provides a method of incorporating additional knowledge about network properties (for example limits on propagation times) on a quantum time transfer network to bound the possible modifications introduced by a malicious party targeting the time transfer procedure.

In an embodiment, the synchronization of clocks at multiple nodes applies to both time-transfer between clocks as well as syntonization. That is, the process described herein is applicable to both clock synchronization (i.e., setting different clocks to read the same time at a given instant) and clock syntonization (i.e., setting clocks to the same frequency or rate, regardless of the time they display. It is recognized that clocks can be synchronized for a given instant, although they will drift away from each other due to slight differences in their time keeping devices. Also, while clocks can be syntonized such that these slight differences in their time keeping devices are compensated in some way, they may still read different times on their faces. The presently disclosed network implementation allows for both secure synchronization and syntonization over the entire network with two or more nodes. Secure syntonization can be achieved, for example, by comparison of time intervals between successful pair detections in two nodes. The capability for secure syntonization in particular can provide advantages for large mesh and secure network communications required for, for example, 5G and military applications. In other words, the quantum communication system described herein can be "natively" used to keep the various clocks syntonized enough such that there is no significant relative drift to affect the accuracy of the time transfer. That is, since the clock frequencies throughout the network are essentially identical, relative clock drift with respect to other clocks can be constantly corrected during operation.

One way in which distribution of entangled photons can be used is to generate a secure key between two nodes such that these keys can be used to encode information transmitted in open channels, thus helping to obscure the timing conclusions from non-authorized passive listeners or eavesdroppers. By using the network configuration described herein for securing positioning, navigation, and timing (PNT) related procedures, for example, the communication system provides an in-built protection of the information gathered from the synchronization procedure.

Figure 3:
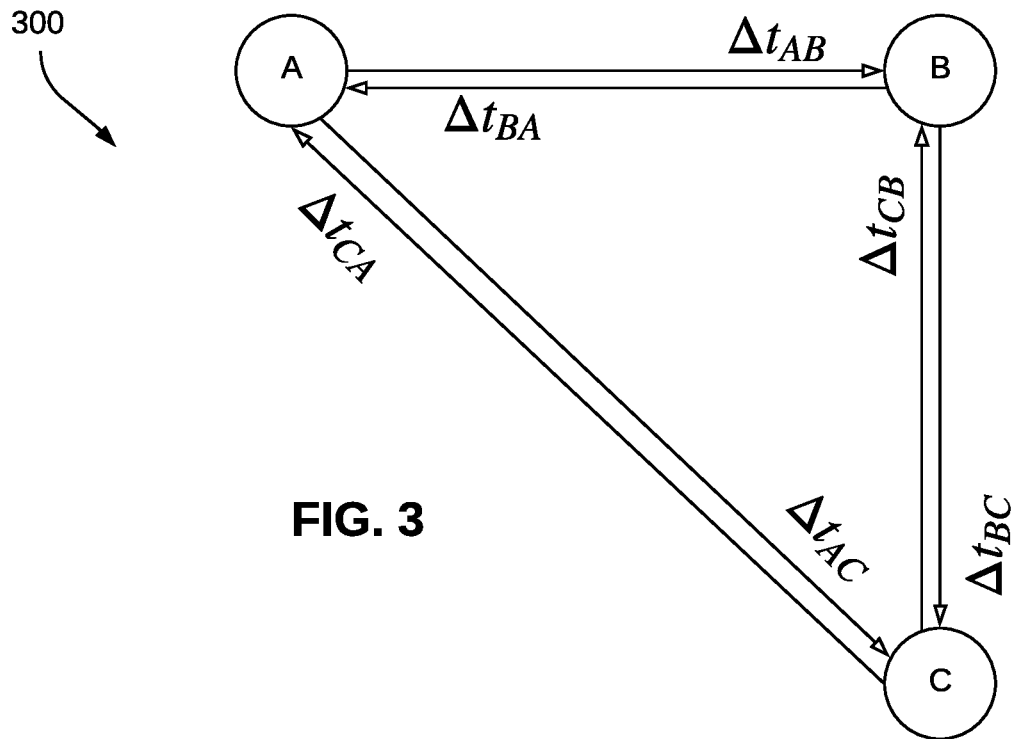
FIG. 3 illustrates a configuration for a three-node quantum communication system, in accordance with an embodiment.

Turning now to FIG. 3, a simple three-node quantum communication network 200 is illustrated. Nodes A, B, and C each contains the node components illustrated in FIG. 2, for example. The various propagation times between the nodes are shown in FIG. 2. As in the previously discussed two-node example, there is no guarantee that the links are symmetric in their propagation times (e.g., $\Delta t_{AB}$ is not necessarily equal to $\Delta t_{BA}$).

With such a three-node network, a first step in the analysis is to determine the three quantities: $\delta_{AB}=t_A-t_B$, $\delta_{BC}=t_B-t_C$, and $\delta_{CA}=t_C-t_A$. Similarly to the two-node case, we obtain the following measured, pairwise quantities:

$$\tau_{AB}=\delta_{AB}+\Delta t_{AB} \quad [\text{Eq. 8}]$$

$$\tau_{BA}=\delta_{BA}+\Delta t_{BA} \quad [\text{Eq. 9}]$$

$$\tau_{BC}=\delta_{BC}+\Delta t_{CB} \quad [\text{Eq. 10}]$$

$$\tau_{CB}=-\delta_{BC}+\Delta t_{BC} \quad [\text{Eq. 11}]$$

$$\tau_{CA}=\delta_{CA}+\Delta t_{CA} \quad [\text{Eq. 12}]$$

$$\tau_{AC}=-\delta_{CA}+\Delta t_{AC} \quad [\text{Eq. 13}]$$

In addition to the pairwise relationships in Eqs. 8-13, the relationship between clocks in a closed loop provides an additional constraint that:

$$\delta_{AB}+\delta_{BC}=\delta_{AC} \quad [\text{Eq. 14}]$$

This additional loop constraint provides possible asymmetries of the system that may potentially be introduced in a Damon attack without detection. Combining Eq. 14 with Eqs. 8-13:

$$\delta_{AB}=\tfrac{1}{2}(\tau_{AB}-\tau_{BA})-\tfrac{1}{2}(\Delta t_{AB}-\Delta t_{BA}) \quad [\text{Eq. 15}]$$

$$\delta_{BC}=\tfrac{1}{2}(\tau_{BC}-\tau_{CB})-\tfrac{1}{2}(\Delta t_{BC}-\Delta t_{CB}) \quad [\text{Eq. 16}]$$

$$\delta_{CA}=\tfrac{1}{2}(\tau_{CA}-\tau_{AC})-\tfrac{1}{2}(\Delta t_{CA}-\Delta t_{AC}) \quad [\text{Eq. 17}]$$

For convenience, it is assumed that $\epsilon_{AB}=(\Delta t_{AB}-\Delta t_{BA})$ and $m_{AB}=(\tau_{AB}-\tau_{BA})$ and similarly for equivalent quantities between other nodes. The parameter E corresponds to the asymmetry of each quantum channel between nodes, and m corresponds to the differences between the cross-correlations that occur between two nodes in each direction. Combining the equations and constraints above:

$$\tfrac{1}{2}(m_{CA}-m_{BC}-m_{AB})=\epsilon_{CA}-\epsilon_{bc}-\epsilon E_{AB} \quad [\text{Eq. 18}]$$

Eq. 18 implies that even an all-powerful Damon is constrained in the way it may be able to manipulate the quantum channels. Moreover, such manipulations would need to be performed all over the network to maintain consistency that avoids detection. In other words, in a three-node network, it is recognized herein that two extra pieces of additional information are enough to completely determine the system. For example, if we know that any two channels are symmetric (e.g., $\Delta t_{AB}=\Delta t_{BA}$ and $\Delta t_{AC}=\Delta t_{CA}$), then there are no longer any modifications that can be performed by Damon that do not break at least one of the known relationships defined in equations above, thus ensuring time transmission within the network is secure.

As the number of nodes is increased, the number of closed loops that can be defined within the network grows and the ability of Damon to arbitrarily manipulate the measured time differences is further constrained. This property, combined with available physical information on sections of the network, can be used to establish confidence intervals on the measured time differences all over the network, even when additional information is concerned with only a local section. Examples of suitable additional information include knowledge that a particular channel/link is symmetric, knowledge that the propagation times cannot be negative, and knowledge that photo propagation speeds cannot be faster than the speed of light, among others. Furthermore, topology and connectivity factors into the constraints in networks with four or more nodes, as will be discussed hereinafter.

Rewriting Eqs. 8-13 with the unknowns on the left-hand side of the equations and the known values (or measurable quantities) on the right-hand side, the following equations hold for a three-node network:

$$\Delta t_{AB}+\delta_{AB}=\tau_{AB} \quad [\text{Eq. 19}]$$

$$\Delta t_{BA}-\delta_{AB}=\tau_{BA} \quad [\text{Eq. 20}]$$

$$\delta t_{CB}+\delta_{BC}=\tau_{BC} \quad [\text{Eq. 21}]$$

$$\Delta t_{BC}-\delta_{BC}=\tau_{CB} \quad [\text{Eq. 22}]$$

$$\Delta t_{CA}+\delta_{CA}=\tau_{CA} \quad [\text{Eq. 23}]$$

$$\Delta t_{AC}-\delta_{CA}=\tau_{AC} \quad [\text{Eq. 24}]$$

Defining a quantum channel as symmetric when its corresponding $\epsilon$ value is zero, the symmetry relations between each pair of nodes can be rewritten as:

$$\Delta t_{AB}-\Delta t_{BA}=\epsilon_{AB} \quad [\text{Eq. 25}]$$

$$\Delta t_{BC}-\Delta t_{CB}=\epsilon_{BC} \quad [\text{Eq. 26}]$$

$$\Delta t_{CA}-\Delta t_{AC}=\epsilon_{CA} \quad [\text{Eq. 27}]$$

When $\epsilon$ is non-zero, the channel is defined as being asymmetric. These equations can be rewritten in a matrix form Mx=r, which takes the form:

$$M := \begin{bmatrix} 1 & 0 & 0 & 0 & 0 & 0 & 1 & 0 & 0 \\ 0 & 1 & 0 & 0 & 0 & 0 & -1 & 0 & 0 \\ 0 & 0 & 1 & 0 & 0 & 0 & 0 & 1 & 0 \\ 0 & 0 & 0 & 1 & 0 & 0 & 0 & -1 & 0 \\ 0 & 0 & 0 & 0 & 1 & 0 & 0 & 0 & 1 \\ 0 & 0 & 0 & 0 & 0 & 1 & 0 & 0 & -1 \\ 1 & -1 & 0 & 0 & 0 & 0 & 0 & 0 & 0 \\ 0 & 0 & 1 & -1 & 0 & 0 & 0 & 0 & 0 \\ 0 & 0 & 0 & 0 & 1 & -1 & 0 & 0 & 0 \end{bmatrix} \quad [\text{Eq. 28}]$$

$$x := \begin{bmatrix} \Delta t_{AB} \\ \Delta t_{BA} \\ \Delta t_{CB} \\ \Delta t_{BC} \\ \Delta t_{CA} \\ \Delta t_{AC} \\ \delta_{AB} \\ \delta_{BC} \\ \delta_{CA} \end{bmatrix} \quad r := \begin{bmatrix} \tau_{AB} \\ \tau_{BA} \\ \tau_{CB} \\ \tau_{BC} \\ \tau_{CA} \\ \tau_{AC} \\ \epsilon_{AB} \\ \epsilon_{BC} \\ \epsilon_{CA} \end{bmatrix}$$

M may also be divided into four block submatrices:

$$M := \left[\begin{array}{c|c} A & B \\ \hline C & D \end{array}\right] \quad [\text{Eq. 29}]$$

In Eq. 29, A=I is the 2n×2n (6 by 6) identity matrix, $C=B^T$ (i.e., C is the transpose of B), and D=0 is the n×n (3 by 3) zero matrix. Thus, M can be re-expressed as:

$$M := \left[\begin{array}{c|c} I & B \\ \hline B^T & 0 \end{array}\right] \quad [\text{Eq. 30}]$$

The inverse of M can be computed with block-wise inversion, with the help of the Schur complement of A $$M^{-1} := \left[\begin{array}{c|c} I - B(B^T B)^{-1} B^T & B(B^T B)^{-1} \\ \hline (B^T B)^{-1} B^T & -(B^T B)^{-1} \end{array}\right] \quad [\text{Eq. 31}]$$

Recognizing that the value $B^T B = 2I$ and its inverse $(B^T B)^{-1} = \frac{1}{2}I$ in a particular case, Eq. 31 can be further simplified as:

$$M^{-1} := \frac{1}{2}\left[\begin{array}{c|c} 2I - BB^T & B \\ \hline B^T & -I \end{array}\right] \quad [\text{Eq. 32}]$$

To solve for the unknowns x in Eq. 28, Mx=r is multiplied by $M^{-1}$ to obtain:

$$x = M^{-1} r = \frac{1}{2}\left[\begin{array}{c|c} 2I - BB^T & B \\ \hline B^T & -I \end{array}\right]\left[\begin{array}{c} \tau \\ \hline \epsilon \end{array}\right] = \frac{1}{2}\left[\begin{array}{c} 2\tau - BB^T \tau + B\epsilon \\ \hline B^T \tau - \epsilon \end{array}\right] \quad [\text{Eq. 33}]$$

Written in another way:

$$\left[\begin{array}{c} \Delta t \\ \hline \delta \end{array}\right] = \frac{1}{2}\left[\begin{array}{c} 2\tau - BB^T \tau + B\epsilon \\ \hline B^T \tau - \epsilon \end{array}\right] \quad [\text{Eq. 34}]$$

Eq. 34 can be split along the submatrix blocks:

$$2\Delta t = (2 - BB^T)\tau + B\epsilon \quad [\text{Eq. 35}]$$

$$2\delta = B^T \tau - \epsilon \quad [\text{Eq. 36}]$$

Inserting the various known values, we obtain:

$$2\begin{bmatrix} \Delta t_{AB} \\ \Delta t_{BA} \\ \Delta t_{CB} \\ \Delta t_{BC} \\ \Delta t_{CA} \\ \Delta t_{AC} \end{bmatrix} = 2\begin{bmatrix} \tau_{AB} \\ \tau_{BA} \\ \tau_{CB} \\ \tau_{BC} \\ \tau_{CA} \\ \tau_{AC} \end{bmatrix} - \begin{bmatrix} 1 & -1 & 0 & 0 & 0 & 0 \\ -1 & 1 & 0 & 0 & 0 & 0 \\ 0 & 0 & 1 & -1 & 0 & 0 \\ 0 & 0 & -1 & 1 & 0 & 0 \\ 0 & 0 & 0 & 0 & 1 & -1 \\ 0 & 0 & 0 & 0 & -1 & 1 \end{bmatrix}\begin{bmatrix} \tau_{AB} \\ \tau_{BA} \\ \tau_{CB} \\ \tau_{BC} \\ \tau_{CA} \\ \tau_{AC} \end{bmatrix} + \begin{bmatrix} 1 & 0 & 0 \\ -1 & 0 & 0 \\ 0 & 1 & 0 \\ 0 & -1 & 0 \\ 0 & 0 & 1 \\ 0 & 0 & -1 \end{bmatrix}\begin{bmatrix} \epsilon_{AB} \\ \epsilon_{BC} \\ \epsilon_{CA} \end{bmatrix} \quad [\text{Eq. 37}]$$

$$\Delta t_{AB} = \frac{\tau_{AB} + \tau_{BA}}{2} + \epsilon_{AB} \quad [\text{Eq. 38}]$$

$$\Delta t_{BA} = \frac{\tau_{BA} + \tau_{AB}}{2} - \epsilon_{AB} \quad [\text{Eq. 39}]$$

$$\Delta t_{CB} = \frac{\tau_{CB} + \tau_{BC}}{2} + \epsilon_{BC} \quad [\text{Eq. 40}]$$

$$\Delta t_{BC} = \frac{\tau_{BC} + \tau_{CB}}{2} - \epsilon_{BC} \quad [\text{Eq. 41}]$$

$$\Delta t_{CA} = \frac{\tau_{CA} + \tau_{AC}}{2} + \epsilon_{CA} \quad [\text{Eq. 42}]$$

$$\Delta t_{AC} = \frac{\tau_{AC} + \tau_{CA}}{2} - \epsilon_{CA} \quad [\text{Eq. 43}]$$

Thus, for the clock time differences:

$$2\begin{bmatrix} \delta_{AB} \\ \delta_{BC} \\ \delta_{CA} \end{bmatrix} = \begin{bmatrix} 1 & -1 & 0 & 0 & 0 & 0 \\ 0 & 0 & 1 & -1 & 0 & 0 \\ 0 & 0 & 0 & 0 & 1 & -1 \end{bmatrix}\begin{bmatrix} \tau_{AB} \\ \tau_{BA} \\ \tau_{CB} \\ \tau_{BC} \\ \tau_{CA} \\ \tau_{AC} \end{bmatrix} - \begin{bmatrix} \epsilon_{AB} \\ \epsilon_{BC} \\ \epsilon_{CA} \end{bmatrix} \quad [\text{Eq. 44}]$$

$$\delta_{AB} = \frac{1}{2}(\tau_{AB} - \tau_{BA} - \epsilon_{AB}) \quad [\text{Eq. 45}]$$

$$\delta_{BC} = \frac{1}{2}(\tau_{CB} - \tau_{BC} - \epsilon_{BC}) \quad [\text{Eq. 46}]$$

$$\delta_{CA} = \frac{1}{2}(\tau_{CA} - \tau_{AC} - \epsilon_{CA}) \quad [\text{Eq. 47}]$$

The symmetry relations used above may be substituted with other limitations. Again, revisiting Eqs. 8-13, with the unknowns are grouped on the left-hand side of the equations and the known values (or measurable quantities) on the right-hand side, for a network of three nodes:

$$\Delta T_{AB} + \delta_{AB} = \tau_{AB} \quad [\text{Eq. 48}]$$

$$\Delta t_{BA} - \delta_{AB} = \tau_{BA} \quad [\text{Eq. 49}]$$

$$\Delta t_{CB} + \delta_{BC} = \tau_{BC} \quad [\text{Eq. 50}]$$

$$\Delta t_{BC} - \delta_{BC} = \tau_{CB} \quad [\text{Eq. 51}]$$

$$\Delta t_{CA} + \delta_{CA} = \tau_{CA} \quad [\text{Eq. 52}]$$

$$\Delta t_{AC} - \delta_{CA} = \tau_{AC} \quad [\text{Eq. 53}]$$

For the symmetry relations, Eq. 14 is substituted for the last closure relation:

$$\Delta t_{AB} - \Delta t_{BA} = \epsilon_{AB} \quad [\text{Eq. 54}]$$

$$\Delta t_{BC} - \Delta t_{CB} = \epsilon_{BC} \quad [\text{Eq. 55}]$$

$$\delta_{AB} + \delta_{BC} + \delta_{CA} = 0 \quad [\text{Eq. 56}]$$

Again, a quantum channel is defined as symmetric when its corresponding $\epsilon$ value is zero. When $\epsilon$ is non-zero, the channel is considered asymmetric. In this particular example, because of the substitution, there are no restriction on the relationship of $\Delta t_{CA}$ and $\Delta t_{AC}$, meaning the channel connecting nodes A and C could be arbitrarily asymmetric. The system of equations can be rewritten in a matrix form Mx=r, which takes the form $$M := \left[\begin{array}{cccccc|ccc} 1 & 0 & 0 & 0 & 0 & 0 & 1 & 0 & 0 \\ 0 & 1 & 0 & 0 & 0 & 0 & -1 & 0 & 0 \\ 0 & 0 & 1 & 0 & 0 & 0 & 0 & 1 & 0 \\ 0 & 0 & 0 & 1 & 0 & 0 & 0 & -1 & 0 \\ 0 & 0 & 0 & 0 & 1 & 0 & 0 & 0 & 1 \\ 0 & 0 & 0 & 0 & 0 & 1 & 0 & 0 & -1 \\ \hline 1 & -1 & 0 & 0 & 0 & 0 & 0 & 0 & 0 \\ 0 & 0 & 1 & -1 & 0 & 0 & 0 & 0 & 0 \\ 0 & 0 & 0 & 0 & 0 & 0 & 1 & 1 & 1 \end{array}\right] \quad [\text{Eq. 57}]$$

$$x := \begin{bmatrix} \Delta t_{AB} \\ \Delta t_{BA} \\ \Delta t_{CB} \\ \Delta t_{BC} \\ \Delta t_{CA} \\ \Delta t_{AC} \\ \delta_{AB} \\ \delta_{BC} \\ \delta_{CA} \end{bmatrix} \quad r := \begin{bmatrix} \tau_{AB} \\ \tau_{BA} \\ \tau_{CB} \\ \tau_{BC} \\ \tau_{CA} \\ \tau_{AC} \\ \epsilon_{AB} \\ \epsilon_{BC} \\ 0 \end{bmatrix}$$

While it is no longer possible to simplify the inverse of M as in Eqs. 29-32, it can be assured that there is a solution as long as A and the Schur complement of A in $M/A := D - CA^{-1}B$ have inverses. Thus, A will always remain the identity no matter what loop closure relations are substituted. The Schur complement of A for this system takes the form:

$$M/A := \begin{bmatrix} 0 & 0 & 0 \\ 0 & 0 & 0 \\ 1 & 1 & 1 \end{bmatrix} - \begin{bmatrix} 1 & -1 & 0 & 0 & 0 & 0 \\ 0 & 0 & 1 & -1 & 0 & 0 \\ 0 & 0 & 0 & 0 & 0 & 0 \end{bmatrix} \begin{bmatrix} 1 & 0 & 0 \\ -1 & 0 & 0 \\ 0 & 1 & 0 \\ 0 & -1 & 0 \\ 0 & 0 & 1 \\ 0 & 0 & -1 \end{bmatrix} = \begin{bmatrix} -2 & 0 & 0 \\ 0 & -2 & 0 \\ 1 & 1 & 1 \end{bmatrix}$$ 
[Eq. 58]

Eq. 58 does have an inverse and remains well-conditioned.

Such loop closure equations can be extended for networks with larger numbers of nodes. As an example, the construction of the closure relations can be generalized into a matrix form:

$$\Gamma t = \delta \quad \text{[Eq. 59]}$$

As defined above, each δ is defined as the time difference if any two clocks are brought together in the same location. For a three node network, then, where the ordering is a matter of convention:

$$t_A - t_B := \delta_{AB} := -\delta_{BA} := t_B - t_A \quad \text{[Eq. 60]}$$

$$t_B - t_C := \delta_{BC} := -\delta_{CB} := t_C - t_B \quad \text{[Eq. 61]}$$

$$t_C - t_A := \delta_{CA} := -\delta_{AC} := t_A - t_C \quad \text{[Eq. 62]}$$

Eqs. 60-62 can be arranged into matrix form:

$$\Gamma := \begin{bmatrix} 1 & -1 & 0 \\ 0 & 1 & -1 \\ -1 & 0 & 1 \end{bmatrix} \quad t := \begin{bmatrix} t_A \\ t_B \\ t_C \end{bmatrix} \quad \delta := \begin{bmatrix} \delta_{AB} \\ \delta_{BC} \\ \delta_{CA} \end{bmatrix} \quad \text{[Eq. 63]}$$

Due to the underlying loop (or cycle) structure of matrix Γ, the matrix has a rank $r = -1 = 2$. For the right-hand side δ to exist in the column space of matrix Γ, there will be a set of constraints imposed on the δ values. To generate these constraints, an augmented matrix [Γ|δ] is formed, and linear operations on the rows of this matrix can be performed until it is in a reduced row echelon form:

$$\left[\begin{array}{ccc|c} 1 & -1 & 0 & \delta_{AB} \\ 0 & 1 & -1 & \delta_{BC} \\ -1 & 0 & 1 & \delta_{CA} \end{array}\right] \quad \text{[Eq. 64]}$$

First add row 1 to row 3 to eliminate the leading −1:

$$\left[\begin{array}{ccc|c} 1 & -1 & 0 & \delta_{AB} \\ 0 & 1 & -1 & \delta_{BC} \\ 0 & -1 & 1 & \delta_{AB} + \delta_{CA} \end{array}\right] \quad \text{[Eq. 65]}$$

Next, add row 2 to row 1 to eliminate the −1 in the second column:

$$\left[\begin{array}{ccc|c} 1 & 0 & -1 & \delta_{AB} + \delta_{BC} \\ 0 & 1 & -1 & \delta_{BC} \\ 0 & 0 & 0 & \delta_{AB} + \delta_{CA} \end{array}\right] \quad \text{[Eq. 66]}$$

Thus, Eq. 66 is the reduced row echelon form of [Γ|δ], i.e., rref([Γ|δ]). The bottom row with only zeros can be interpreted as:

$$0 t_A + 0 t_B + 0 t_C = \delta_{AB} + \delta_{BC} + \delta_{CA} \quad \text{[Eq. 67]}$$

The left-hand side reduces to zero. Then, for this system to remain consistent and have a corresponding solution, thus matching Eq. 14 above, the following condition holds true:

$$\delta_{AB} + \delta_{BC} + \delta_{CA} = 0 \quad \text{[Eq. 68]}$$

In other words, the recognition of these specific requirements and limitations on the system allows quantum-secure time transfer across all three nodes. The implementation of such requirements can be handled by a controller at each node, such as controllers 220 and 230 shown in FIG. 2.

This method of quantum-secure time transfer can be further expanded to networks with any number of nodes, as will be described below. While trivial in the three-node case, for larger numbers of nodes the loop closure relations benefit from having a procedural generation method, such as described above. For any network, a matrix Γ may be generated for each quantum channel defined between any two network nodes. The augmented matrix [Γ|δ] can be formed and rewritten into reduced row echelon form (rref). Any rows that contain all zeros on the left columns of the augmented matrix will provide constraints on the values of δ.

Figure 4:
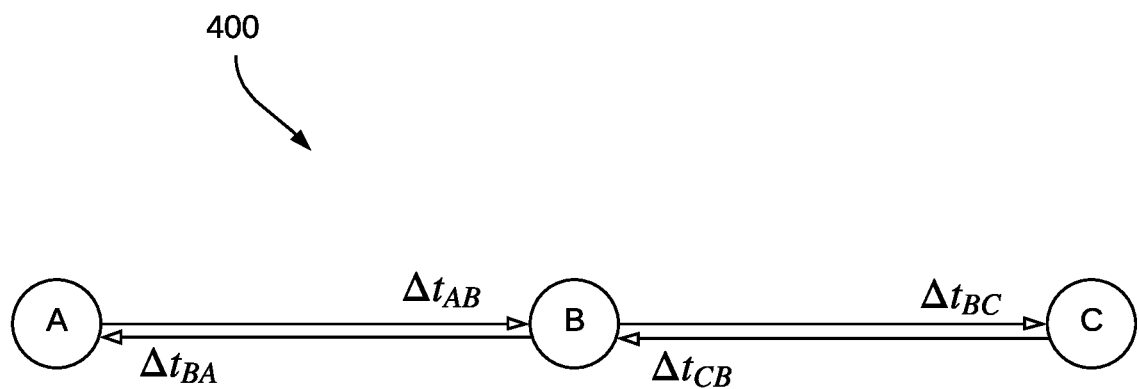
FIG. 4 illustrates another configuration for a three-node quantum communication system, in accordance with an embodiment.

For a network without a closed loop, such as a three-node network 400 illustrated in FIG. 4, in which nodes A and C do not share a quantum channel between them, the matrices for the equation expressing the connection system, Γt=δ, with t and δ as defined above, is relatively simple:

$$\Gamma := \begin{bmatrix} 1 & -1 & 0 \\ 0 & 1 & -1 \end{bmatrix} \quad t := \begin{bmatrix} t_A \\ t_B \\ t_C \end{bmatrix} \quad \delta := \begin{bmatrix} \delta_{AB} \\ \delta_{BC} \end{bmatrix} \quad \text{[Eq. 69]}$$

Using Eq. 69 to generate the rref ([Γ|δ]) leads to $$\left[\begin{array}{ccc|c} 1 & 0 & -1 & \delta_{AB} + \delta_{BC} \\ 0 & 1 & -1 & \delta_{BC} \end{array}\right] \quad \text{[Eq. 70]}$$

It may be noted that there is no row of only zeros in the rref ([Γ|δ]) in Eq. 70. That is, there are no free variables in this system. As a result, other external constraints, such as symmetry in both directions of a quantum channel's propagation times, should be imposed to guarantee the security of the network. In other words, in terms of graph theory, the process of finding the constraints can be summarized as finding the cycle basis of the graph of the underlying network. The constraints on the values of δ arise from drawing a linearly independent set of simple cycles that form a basis in the cycle space of this graph. For the network shown in FIG. 3, a cycle basis would span a vector containing all nodes in the triangle network, and the constraint can be generated by summing the values of δ between the nodes in a cycle, for example, A→B→C→A. In the case of the three-node network shown in FIG. 4, there are no cycles in the underlying graph, thus there is no corresponding cycle basis and no corresponding constraints on the δ values can be imposed. An alternative method, such as finding a cycle basis in polynomial time, can be used to form the fundamental 6 constraint equations of such a network.

Figure 5:
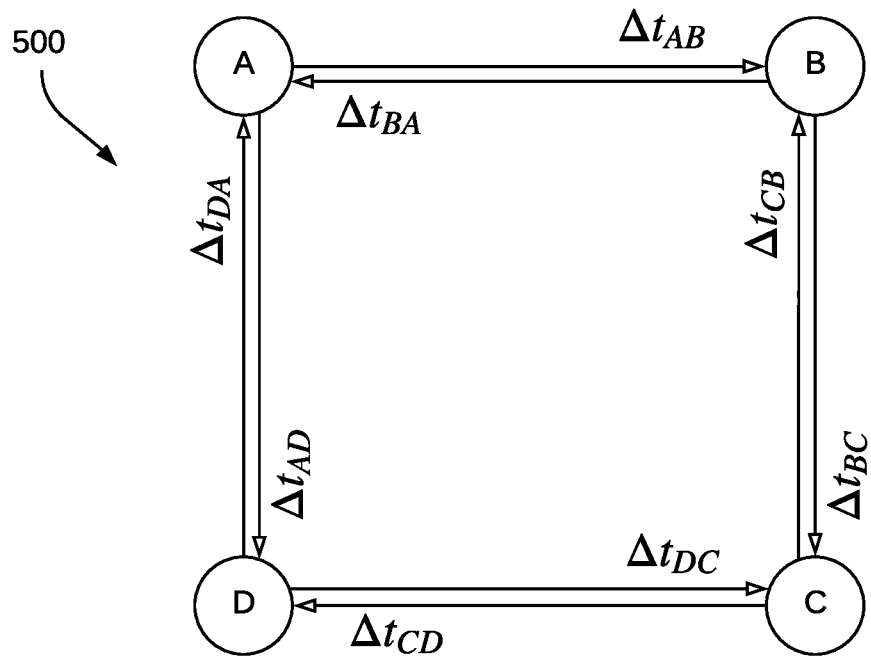
FIG. 5 illustrates a configuration for a four-node quantum communication system, in accordance with an embodiment.

Expanding the implementation of the quantum-secure time transfer to a four-node network, such as a four-node network 500 shown in FIG. 5, a similar analysis is performed. For the network topology shown in FIG. 5, assuming as before that there is no explicit guarantee that the links are symmetric in their propagation times, the relationships between the various propagation times can be written as:

$$\Delta t_{AB} + \delta_{AB} = \tau_{AB} \quad [\text{Eq. 71}]$$

$$\Delta t_{BA} - \delta_{AB} = \tau_{BA} \quad [\text{Eq. 72}]$$

$$\Delta t_{CB} + \delta_{BC} = \tau_{BC} \quad [\text{Eq. 73}]$$

$$\Delta t_{BC} - \delta_{BC} = \tau_{CB} \quad [\text{Eq. 74}]$$

$$\Delta t_{CD} + \delta_{CD} = \tau_{CD} \quad [\text{Eq. 75}]$$

$$\Delta t_{DC} - \delta_{CD} = \tau_{DC} \quad [\text{Eq. 76}]$$

$$\Delta t_{DA} + \delta_{DA} = \tau_{DA} \quad [\text{Eq. 77}]$$

$$\Delta t_{AD} - \delta_{DA} = \tau_{AD} \quad [\text{Eq. 78}]$$

The symmetry relations between each pair of nodes can be written as:

$$\Delta t_{AB} - \Delta t_{BA} = \epsilon_{AB} \quad [\text{Eq. 79}]$$

$$\Delta t_{BC} - \Delta t_{CB} = \epsilon_{BC} \quad [\text{Eq. 80}]$$

$$\Delta t_{CD} - \Delta t_{DC} = \epsilon_{CD} \quad [\text{Eq. 81}]$$

$$\Delta t_{DA} - \Delta t_{AD} = \epsilon_{DA} \quad [\text{Eq. 82}]$$

Again, a quantum channel is defined as symmetric when its corresponding ε value is zero. When ε is non-zero, the channel is asymmetric. As usual, the relevant system of equations take the form:

$$M := \left[\begin{array}{c|c} A & B \\ \hline C & D \end{array}\right] \quad [\text{Eq. 83}]$$

A=I is the 2n×2n (i.e., 8-by-8) identity matrix for n=the number of nodes, C=$B^T$, i.e., C n×2n (i.e., 4-by-8) matrix is the transpose of B 2n×n (i.e., 8 by 4) matrix, and D=0 is the n×n (i.e., 4-by-4) zero matrix. The vector of unknowns and right-hand side then can be expressed as:

$$x := \begin{bmatrix} \Delta t_{AB} \\ \Delta t_{BA} \\ \Delta t_{CB} \\ \Delta t_{BC} \\ \Delta t_{CD} \\ \Delta t_{DC} \\ \Delta t_{DA} \\ \Delta t_{AD} \\ \delta_{AB} \\ \delta_{BC} \\ \delta_{CD} \\ \delta_{DA} \end{bmatrix} \quad r := \begin{bmatrix} \tau_{AB} \\ \tau_{BA} \\ \tau_{CB} \\ \tau_{BC} \\ \tau_{CD} \\ \tau_{DC} \\ \tau_{DA} \\ \tau_{AD} \\ \epsilon_{AB} \\ \epsilon_{BC} \\ \epsilon_{CD} \\ \epsilon_{DA} \end{bmatrix} \quad [\text{Eq. 84}]$$

The solution takes the same form as Eqs. 35 and 36 above.

In the topology of four-node network 500, there can only be one loop around the ring, defined as the path traversing A→B→C→D→A. Again, the values of δ can be expressed as:

$$\delta_{AB} = t_A - t_B \quad [\text{Eq. 85}]$$

$$\delta_{BC} = t_B - t_C \quad [\text{Eq. 86}]$$

$$\delta_{CD} = t_C - t_D \quad [\text{Eq. 87}]$$

$$\delta_{DA} = t_D - t_A \quad [\text{Eq. 88}]$$

Eqs. 85-88 are added to obtain the one loop closure relation:

$$\delta_{AB} + \delta_{BC} + \delta_{CD} + \delta_{DA} = 0 \quad [\text{Eq. 89}]$$

It is noted that this closure relation involves all nodes of the network. Alternatively, the connection system Γt=δ can be considered such that $$\Gamma := \begin{bmatrix} 1 & -1 & 0 & 0 \\ 0 & 1 & -1 & 0 \\ 0 & 0 & 1 & -1 \\ -1 & 0 & 0 & 1 \end{bmatrix} \quad t := \begin{bmatrix} t_A \\ t_B \\ t_C \\ t_D \end{bmatrix} \quad \delta := \begin{bmatrix} \delta_{AB} \\ \delta_{BC} \\ \delta_{CD} \\ \delta_{DA} \end{bmatrix} \quad [\text{Eq. 90}]$$

The augmented matrix [Γ|δ] can be written as:

$$\left[\begin{array}{cccc|c} 1 & -1 & 0 & 0 & \delta_{AB} \\ 0 & 1 & -1 & 0 & \delta_{BC} \\ 0 & 0 & 1 & -1 & \delta_{CD} \\ -1 & 0 & 0 & 1 & \delta_{DA} \end{array}\right] \quad [\text{Eq. 91}]$$

The reduced row echelon format matrix rref ([Γ|δ]) is then:

$$\left[\begin{array}{cccc|c} 1 & 0 & 0 & -1 & \delta_{AB} + \delta_{BC} + \delta_{CD} \\ 0 & 1 & 0 & -1 & \delta_{BC} + \delta_{CD} \\ 0 & 0 & 1 & -1 & \delta_{CD} \\ 0 & 0 & 0 & 0 & \delta_{AB} + \delta_{BC} + \delta_{CD} + \delta_{DA} \end{array}\right] \quad [\text{Eq. 92}]$$

Note Eq. 92 yields the same constraints on the δ values as Eq. 89. One of the symmetry relations can then be substituted for this closure relation instead, thus modifying the C and D submatrices in Eq. 83 as:

$$C := \begin{bmatrix} 1 & -1 & 0 & 0 & 0 & 0 & 0 & 0 \\ 0 & 0 & 1 & -1 & 0 & 0 & 0 & 0 \\ 0 & 0 & 0 & 0 & 1 & -1 & 0 & 0 \\ 0 & 0 & 0 & 0 & 0 & 0 & 0 & 0 \end{bmatrix} \quad D := \begin{bmatrix} 0 & 0 & 0 & 0 \\ 0 & 0 & 0 & 0 \\ 0 & 0 & 0 & 0 \\ 1 & 1 & 1 & 1 \end{bmatrix} \quad [\text{Eq. 93}]$$

The considerations and requirements above can be implemented at each of nodes A, B, C, and D so as to enable quantum-secure time transfer across all four nodes shown in FIG. 5.

Figure 6:
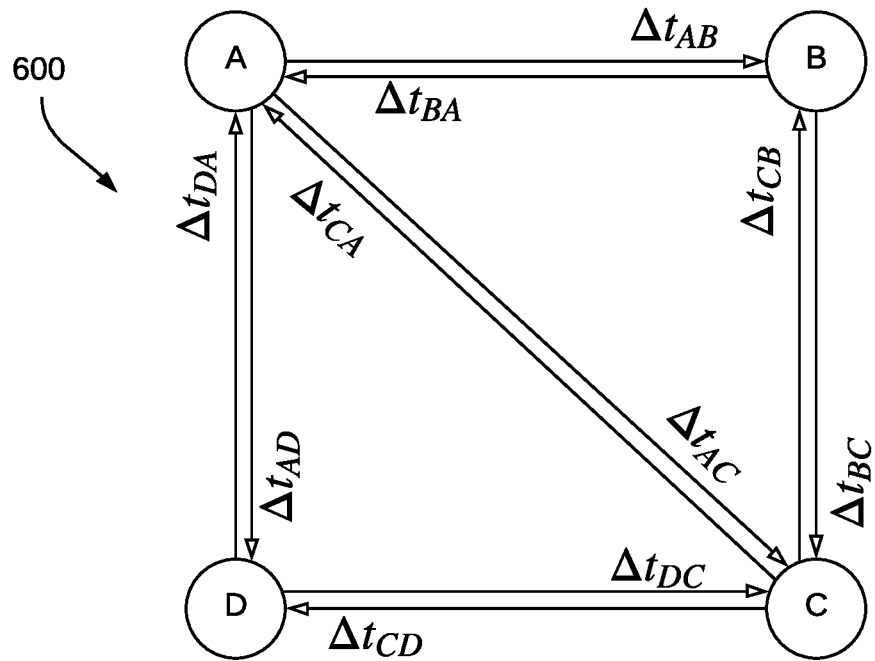
FIG. 6 illustrates another configuration for a four-node quantum communication system, in accordance with an embodiment.

The analysis can be further expanded to add additional quantum channels within the four-node network. In a four-node network 600 shown in FIG. 6, a quantum channel is added to connect nodes A and C. As before, there is no guarantee that the links are symmetric in their propagation times. The relationships between the various propagation times can be written as:

$$\Delta t_{AB} + \delta_{AB} = \tau_{AB} \quad [\text{Eq. 94}]$$

$$\Delta t_{BA} - \delta_{AB} = \tau_{BA} \quad [\text{Eq. 95}]$$

$$\Delta t_{CB} + \delta_{BC} = \tau_{BC} \quad [\text{Eq. 96}]$$

$$\Delta t_{BC} - \delta_{BC} = \tau_{CB} \quad [\text{Eq. 97}]$$

$$\Delta t_{CD} + \delta_{CD} = \tau_{CD} \quad [\text{Eq. 98}]$$

$$\Delta t_{DC} - \delta_{CD} = \tau_{DC} \quad [\text{Eq. 99}]$$

$$\Delta t_{DA} + \delta_{DA} = \tau_{DA} \quad [\text{Eq. 100}]$$

$$\Delta t_{AD} - \delta_{DA} = \tau_{AD} \quad [\text{Eq. 101}]$$

$$\Delta t_{CA} + \delta_{CA} = \tau_{CA} \quad [\text{Eq. 102}]$$

$$\Delta t_{AC} - \delta_{CA} = \tau_{AC} \quad [\text{Eq. 103}]$$

The symmetry relations between each pair of nodes can be written as:

$$\Delta t_{AB} - \Delta t_{BA} = \epsilon_{AB} \quad [\text{Eq. 104}]$$

$$\Delta t_{BC} - \Delta t_{CB} = \epsilon_{BC} \quad [\text{Eq. 105}]$$

$$\Delta t_{CD} - \Delta t_{DC} = \epsilon_{CD} \quad [\text{Eq. 106}]$$

$$\Delta t_{DA} - \Delta t_{AD} = \epsilon_{DA} \quad [\text{Eq. 107}]$$

$$\Delta t_{CA} - \Delta t_{AC} = \epsilon_{CA} \quad [\text{Eq. 108}]$$

Again, a quantum channel is defined as symmetric when its corresponding $\epsilon$ value is zero. When $\epsilon$ is non-zero, the channel is asymmetric. As usual, the relevant system of equations take the form:

$$M := \begin{bmatrix} A & | & B \\ \hline C & | & D \end{bmatrix} \quad [\text{Eq. 109}]$$

In this case, A=I is the (2n+2)×(2n+2) (i.e., 10-by-10) identity matrix, C=$B^T$, i.e., C (n+1)×2(n+1) (i.e., 5-by-10) matrix is the transpose of B (2n+2)×(n+1) (i.e., 10-by-5) matrix, and D=0 is the (n+1)×(n+1) (i.e., 5-by-5) zero matrix. The vector of unknowns and right-hand side then can be expressed as:

$$x := \begin{bmatrix} \Delta t_{AB} \\ \Delta t_{BA} \\ \Delta t_{CB} \\ \Delta t_{BC} \\ \Delta t_{CD} \\ \Delta t_{DC} \\ \Delta t_{DA} \\ \Delta t_{AD} \\ \Delta t_{AC} \\ \Delta t_{CA} \\ \delta_{AB} \\ \delta_{BC} \\ \delta_{CD} \\ \delta_{DA} \\ \delta_{CA} \end{bmatrix} \quad r := \begin{bmatrix} \tau_{AB} \\ \tau_{BA} \\ \tau_{CB} \\ \tau_{BC} \\ \tau_{CD} \\ \tau_{DC} \\ \tau_{DA} \\ \tau_{AD} \\ \tau_{AC} \\ \tau_{CA} \\ \epsilon_{AB} \\ \epsilon_{BC} \\ \epsilon_{CD} \\ \epsilon_{DA} \\ \epsilon_{CA} \end{bmatrix} \quad [\text{Eq. 110}]$$

Even with the additional quantum channel between nodes A and C, the structure of matrix M is preserved since the new quantum channel is independent of the other already established channels. Constructing the connection system $\Gamma t = \delta$ yields:

$$\Gamma := \begin{bmatrix} 1 & -1 & 0 & 0 \\ 0 & 1 & -1 & 0 \\ 0 & 0 & 1 & -1 \\ -1 & 0 & 0 & 1 \\ -1 & 0 & 1 & 0 \end{bmatrix} \quad t := \begin{bmatrix} t_A \\ t_B \\ t_C \\ t_D \end{bmatrix} \quad \delta := \begin{bmatrix} \delta_{AB} \\ \delta_{BC} \\ \delta_{CD} \\ \delta_{DA} \\ \delta_{CA} \end{bmatrix} \quad [\text{Eq. 111}]$$

The augmented matrix $[\Gamma | \delta]$ can be written as:

$$\begin{bmatrix} 1 & -1 & 0 & 0 & | & \delta_{AB} \\ 0 & 1 & -1 & 0 & | & \delta_{BC} \\ 0 & 0 & 1 & -1 & | & \delta_{CD} \\ -1 & 0 & 0 & 1 & | & \delta_{DA} \\ -1 & 0 & 1 & 0 & | & \delta_{CA} \end{bmatrix} \quad [\text{Eq. 112}]$$

The reduced row echelon format matrix $\text{rref}([\Gamma | \delta])$ is then:

$$\begin{bmatrix} 1 & 0 & 0 & -1 & | & \delta_{AB} + \delta_{BC} + \delta_{CD} \\ 0 & 1 & 0 & -1 & | & \delta_{BC} + \delta_{CD} \\ 0 & 0 & 1 & -1 & | & \delta_{CD} \\ 0 & 0 & 0 & 0 & | & \delta_{AB} + \delta_{BC} + \delta_{CD} + \delta_{DA} \\ 0 & 0 & 0 & 0 & | & \delta_{AB} + \delta_{BC} + \delta_{CA} \end{bmatrix} \quad [\text{Eq. 113}]$$

The new quantum channel between nodes A and B creates additional loop closure relations, as can be seen in the bottom two rows in Eq. 113:

$$\delta_{AB} + \delta_{BC} + \delta_{CD} + \delta_{DA} = 0 \quad [\text{Eq. 114}]$$

$$\delta_{AB} + \delta_{BC} + \delta_{CA} = 0 \quad [\text{Eq. 115}]$$

Then the other submatrices C and D can be written as:

$$C := \begin{bmatrix} 1 & -1 & 0 & 0 & 0 & 0 & 0 & 0 & 0 & 0 \\ 0 & 0 & 1 & -1 & 0 & 0 & 0 & 0 & 0 & 0 \\ 0 & 0 & 0 & 0 & 1 & -1 & 0 & 0 & 0 & 0 \\ 0 & 0 & 0 & 0 & 0 & 0 & 0 & 0 & 0 & 0 \\ 0 & 0 & 0 & 0 & 0 & 0 & 0 & 0 & 0 & 0 \end{bmatrix} \quad [\text{Eq. 116}]$$

$$D := \begin{bmatrix} 0 & 0 & 0 & 0 & 0 \\ 0 & 0 & 0 & 0 & 0 \\ 0 & 0 & 0 & 0 & 0 \\ 1 & 1 & 0 & 0 & 1 \\ 1 & 1 & 1 & 1 & 0 \end{bmatrix}$$

The Schuler complement of matrix M does have an inverse and remains well-conditioned:

$$M/A := \begin{bmatrix} -2 & 0 & 0 & 0 & 0 \\ 0 & -2 & 0 & 0 & 0 \\ 0 & 0 & -2 & 0 & 0 \\ 1 & 1 & 0 & 0 & 1 \\ 1 & 1 & 1 & 1 & 0 \end{bmatrix} \quad [\text{Eq. 117}]$$

Thus, adding another connection to the four-node network of FIG. 4 resulted in another loop closure relation available for use in defining system symmetries and conditions. In essence, if a cycle (or cycles) is added into a given network, another closure equation can be generated if the new cycle does not lie in the span of the current cycle basis. For a network with n nodes, the n−1=3 channel symmetry constraints are still imposed on the network. It is recognized that this condition results in a reduction from the total of five quantum channels that exist in the topology illustrated in FIG. 6.

Figure 7:
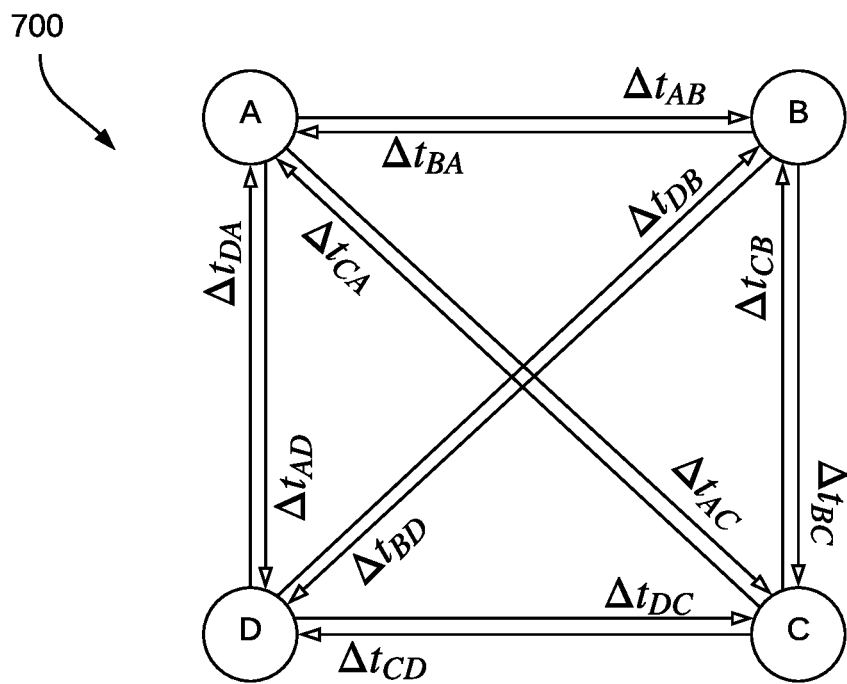
FIG. 7 illustrates still another configuration for a four-node quantum communication system, in accordance with an embodiment.

The method of quantum-secure time transfer can be further expanded to a maximally connected network shown in FIG. 7. As discussed above, the addition of another quantum channel results in the generation of another loop closure relation, and this quantum channel does not need to be symmetrically constrained.

As shown in FIG. 7, a four-node network 700 includes quantum channels between the four nodes in all possible pair combinations. As before, the relationships between the various propagation times can be expressed as:

$$\Delta t_{AB} + \delta_{AB} = \tau_{AB} \quad [\text{Eq. 118}]$$

$$\Delta t_{BA} - \delta_{AB} = \tau_{BA} \quad [\text{Eq. 119}]$$

$$\Delta t_{CB} + \delta_{BC} = \tau_{BC} \quad [\text{Eq. 120}]$$

$$\Delta t_{BC} - \delta_{BC} = \tau_{CB} \quad [\text{Eq. 121}]$$

$$\Delta t_{CD} + \delta_{CD} = \tau_{CD} \quad [\text{Eq. 122}]$$

$$\Delta t_{DC} - \delta_{CD} = \tau_{DC} \quad [\text{Eq. 123}]$$

$$\Delta t_{DA} + \delta_{DA} = \tau_{DA} \quad [\text{Eq. 124}]$$

$$\Delta t_{AD} - \delta_{DA} = \tau_{AD} \quad [\text{Eq. 125}]$$

$$\Delta t_{AC} + \delta_{AC} = \tau_{AC} \quad [\text{Eq. 126}]$$

$$\Delta t_{CA} - \delta_{AC} = \tau_{CA} \quad [\text{Eq. 127}]$$

$$\Delta t_{BD} + \delta_{BD} = \tau_{BD} \quad [\text{Eq. 128}]$$

$$\Delta t_{DB} - \delta_{BD} = \tau_{DB} \quad [\text{Eq. 129}]$$

The symmetry relations between each pair of nodes can be written as:

$$\Delta t_{AB} - \Delta t_{BA} = \epsilon_{AB} \quad [\text{Eq. 130}]$$

$$\Delta t_{BC} - \Delta t_{CB} = \epsilon_{BC} \quad [\text{Eq. 131}]$$

$$\Delta t_{CD} - \Delta t_{DC} = \epsilon_{CD} \quad [\text{Eq. 132}]$$

$$\Delta t_{DA} - \Delta t_{AD} = \epsilon_{DA} \quad [\text{Eq. 133}]$$

$$\Delta t_{CA} - \Delta t_{AC} = \epsilon_{CA} \quad [\text{Eq. 134}]$$

$$\Delta t_{DB} - \Delta t_{BD} = \epsilon_{DB} \quad [\text{Eq. 135}]$$

Again, a quantum channel is defined as symmetric when its corresponding $\epsilon$ value is zero. When $\epsilon$ is non-zero, the channel is asymmetric. As usual, the relevant system of equations takes the form:

$$M := \begin{bmatrix} A & | & B \\ \hline C & | & D \end{bmatrix} \quad [\text{Eq. 136}]$$

In this case, A=I is the $n(n-1) \times n(n-1)$ (i.e., 12-by-12) identity matrix, $C=B^T$, i.e., C n $(n-1)/2 \times n(n-1)/2$ (i.e., 6-by-12) matrix is the transpose of B $n(n-1) \times n(n-1)/2$ (i.e., 12-by-6) matrix, and D=0 is the $n(n-1)/2 \times n(n-1)/2$ (i.e., 6-by-6) zero matrix. The vector of unknowns and right-hand side then can be expressed as:

$$x := \begin{bmatrix} \Delta t_{AB} \\ \Delta t_{BA} \\ \Delta t_{CB} \\ \Delta t_{BC} \\ \Delta t_{CD} \\ \Delta t_{DC} \\ \Delta t_{DA} \\ \Delta t_{AD} \\ \Delta t_{AC} \\ \Delta t_{CA} \\ \Delta t_{BD} \\ \Delta t_{DB} \\ \delta_{AB} \\ \delta_{BC} \\ \delta_{CD} \\ \delta_{DA} \\ \delta_{CA} \\ \delta_{DB} \end{bmatrix} \quad r := \begin{bmatrix} \tau_{AB} \\ \tau_{BA} \\ \tau_{CB} \\ \tau_{BC} \\ \tau_{CD} \\ \tau_{DC} \\ \tau_{DA} \\ \tau_{AD} \\ \tau_{AC} \\ \tau_{CA} \\ \tau_{BD} \\ \tau_{DB} \\ \epsilon_{AB} \\ \epsilon_{BC} \\ \epsilon_{CD} \\ \epsilon_{DA} \\ \epsilon_{CA} \\ \epsilon_{DB} \end{bmatrix} \quad [\text{Eq. 137}]$$

The $\delta$ equations in this case are:

$$t_A - t_B = \delta_{AB} \quad [\text{Eq. 138}]$$

$$t_B - t_C = \delta_{BC} \quad [\text{Eq. 139}]$$

$$t_C - t_D = \delta_{CD} \quad [\text{Eq. 140}]$$

$$t_D - t_A = \delta_{DA} \quad [\text{Eq. 141}]$$

$$t_C - t_A = \delta_{CA} \quad [\text{Eq. 142}]$$

$$t_D - t_B = \delta_{DB} \quad [\text{Eq. 143}]$$

Written in the connection system $\Gamma t = \delta$ matrix form:

$$\begin{bmatrix} 1 & -1 & 0 & 0 \\ 0 & 1 & -1 & 0 \\ 0 & 0 & 1 & -1 \\ -1 & 0 & 0 & 1 \\ -1 & 0 & 1 & 0 \\ 0 & -1 & 0 & 1 \end{bmatrix} \begin{bmatrix} t_A \\ t_B \\ t_C \\ t_D \end{bmatrix} = \begin{bmatrix} \delta_{AB} \\ \delta_{BC} \\ \delta_{CD} \\ \delta_{DA} \\ \delta_{CA} \\ \delta_{DB} \end{bmatrix}$$ [Eq. 144]

After manipulation, the reduced row echelon format matrix rref ([Γ|δ]) is then:

$$\begin{bmatrix} 1 & 0 & 0 & 0 & -1 & \delta_{AB} + \delta_{BC} + \delta_{CD} \\ 0 & 1 & 0 & 0 & -1 & \delta_{BC} + \delta_{CD} \\ 0 & 0 & 1 & 0 & -1 & \delta_{CD} \\ 0 & 0 & 0 & 0 & 0 & \delta_{AB} + \delta_{BC} + \delta_{CD} + \delta_{DA} \\ 0 & 0 & 0 & 0 & 0 & \delta_{AB} + \delta_{BC} + \delta_{CA} \\ 0 & 0 & 0 & 0 & 0 & \delta_{BC} + \delta_{CD} + \delta_{DB} \end{bmatrix}$$ [Eq. 145]

We then may use the three loop closure relations formed in the bottom three rows of the augmented reduced row echelon form of [Γ|δ]:

$\delta_{AB}+\delta_{BC}+\delta_{CD}+\delta_{DA}=0$ [Eq. 146]

$\delta_{AB}+\delta_{BC}+\delta_{CA}=0$ [Eq. 147]

$\delta_{BC}+\delta_{CD}+\delta_{DB}=0$ [Eq. 148]

An alternative method for finding a linearly independent set of loop closure relations is to use graph theory. For example, using the NetworkX Python library, a cycle basis of this graph may be computed. Using this method, a basis set can be defined as:

Loop 1 closure relation (A→B→C→A)

$\delta_{AB}+\delta_{BC}+\delta_{CA}=0$ [Eq. 149]

Loop 2 closure relation (C→D→A→C)

$\delta_{CD}+\delta_{DA}-\delta_{CA}=0$ [Eq. 150]

Loop 3 closure relation (B→C→D→B)

$\delta_{BC}+\delta_{CD}+\delta_{DB}=0$ [Eq. 151]

Then the C and D submatrices can be written as:

$$C := \begin{bmatrix} 1 & -1 & 0 & 0 & 0 & 0 & 0 & 0 & 0 & 0 & 0 \\ 0 & 0 & 1 & -1 & 0 & 0 & 0 & 0 & 0 & 0 & 0 \\ 0 & 0 & 0 & 0 & 1 & -1 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \end{bmatrix}$$ [Eq. 152]

$$D := \begin{bmatrix} 0 & 0 & 0 & 0 & 0 & 0 \\ 0 & 0 & 0 & 0 & 0 & 0 \\ 0 & 0 & 0 & 0 & 0 & 0 \\ 1 & 1 & 0 & 0 & 1 & 0 \\ 0 & 0 & 1 & 1 & -1 & 0 \\ 0 & 1 & 1 & 0 & 0 & 1 \end{bmatrix}$$

The Schur complement of A does have an inverse and remains well-conditioned:

$$M/A := \begin{bmatrix} -2 & 0 & 0 & 0 & 0 & 0 \\ 0 & -2 & 0 & 0 & 0 & 0 \\ 0 & 0 & -2 & 0 & 0 & 0 \\ 1 & 1 & 0 & 0 & 1 & 0 \\ 1 & 1 & 1 & 1 & -1 & 0 \\ 0 & 1 & 1 & 0 & 0 & 1 \end{bmatrix}$$ [Eq. 153]

It is recognized herein that, regardless of the number of quantum channels added into a network, n−1=3 symmetry closure relations need to be provided. These relations can be provided, for example, in the form of symmetry constraints for light propagation to be reciprocal within a particular quantum channel. With such a relation defined, it is possible to have a network with nodes that have a higher degree of quantum channel connections than two (not counting themselves) and not have to stipulate that channel be symmetric.

Figure 8:
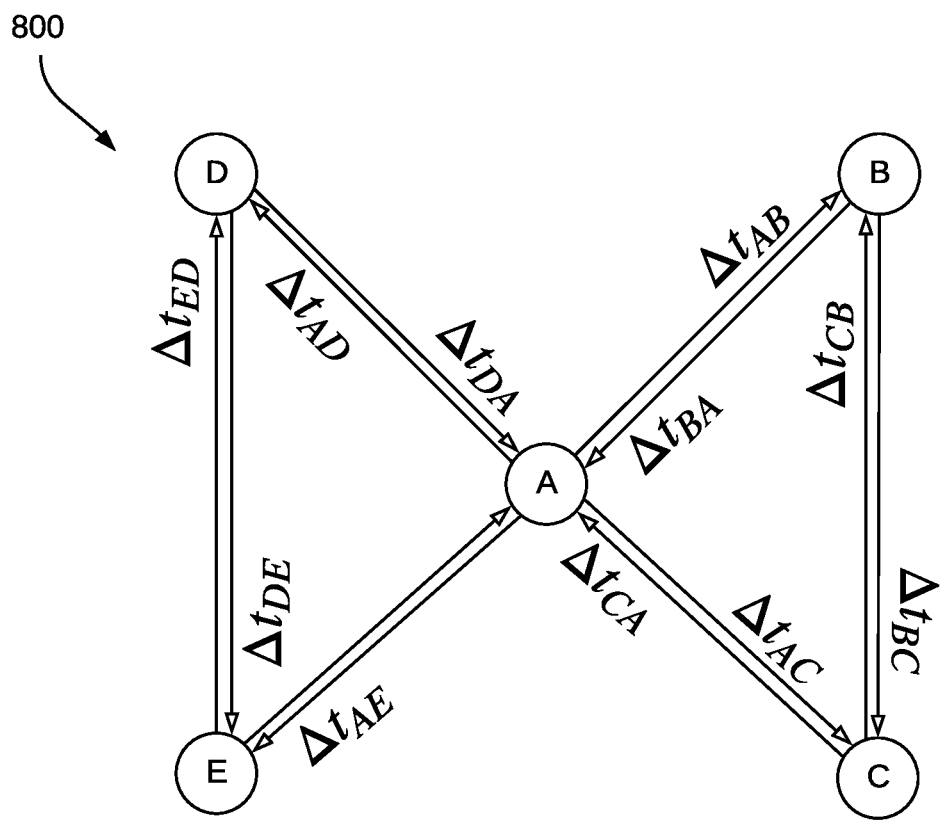
FIG. 8 illustrates a configuration for a five-node quantum communication system, in accordance with an embodiment.

As another example, the requirements for enabling quantum-secure time transfer in a five-node network is considered. An example of a time-transfer network 800 is shown in FIG. 8. As before, the relationships between the various propagation times can be expressed as:

$\Delta t_{AB}+\delta_{AB}=\tau_{AB}$ [Eq. 154]

$\Delta t_{BA}-\delta_{AB}=\tau_{BA}$ [Eq. 155]

$\Delta t_{BC}+\delta_{BC}=\tau_{BC}$ [Eq. 156]

$\Delta t_{CB}+\delta_{BC}=\tau_{CB}$ [Eq. 157]

$\Delta t_{CA}+\delta_{CA}=\tau_{CA}$ [Eq. 158]

$\Delta t_{AC}-\delta_{CA}=\tau_{AC}$ [Eq. 159]

$\Delta t_{AD}+\delta_{AD}=\tau_{AD}$ [Eq. 160]

$\Delta t_{DA}-\delta_{AD}=\tau_{DA}$ [Eq. 161]

$\Delta t_{DE}+\delta_{DE}=\tau_{DE}$ [Eq. 162]

$\Delta t_{ED}-\delta_{DE}=\tau_{DE}$ [Eq. 163]

$\Delta t_{EA}+\delta_{EA}=\tau_{EA}$ [Eq. 164]

$\Delta t_{AE}-\delta_{EA}=\tau_{AE}$ [Eq. 165]

The symmetry relations between each pair of nodes can be written as:

$\Delta t_{AB}-\Delta t_{BA}=\epsilon_{AB}$ [Eq. 166]

$\Delta t_{BC}-\Delta t_{CB}=\epsilon_{BC}$ [Eq. 167]

$\Delta t_{CA}-\Delta t_{AC}=\epsilon_{CA}$ [Eq. 168]

$\Delta t_{AD}-\Delta t_{DA}=\epsilon_{AD}$ [Eq. 169]

$\Delta t_{DE}-\Delta t_{ED}=\epsilon_{DE}$ [Eq. 170]

$\Delta t_{EA}-\Delta t_{AE}=\epsilon_{EA}$ [Eq. 171]

As above, a quantum channel is defined as symmetric when its corresponding ε value is zero. When ε is non-zero, the channel is asymmetric. As usual, the relevant system of equations takes the form:

$$M := \begin{bmatrix} A & B \\ \hline C & D \end{bmatrix} \quad \text{[Eq. 172]}$$

In this case, A=I is the 12-by-12 identity matrix, $C=B^T$ is a 6-by-12 matrix transpose of B (a 12-by-6 matrix), and D=0 is the (n+1)×(n+1) (i.e., 6-by-6) zero matrix. The vector of unknowns and right-hand side then can be expressed as:

$$x := \begin{bmatrix} \Delta t_{AB} \\ \Delta t_{BA} \\ \Delta t_{BC} \\ \Delta t_{CB} \\ \Delta t_{CA} \\ \Delta t_{AC} \\ \Delta t_{AD} \\ \Delta t_{DA} \\ \Delta t_{DE} \\ \Delta t_{ED} \\ \Delta t_{EA} \\ \Delta t_{AE} \\ \delta_{AB} \\ \delta_{BC} \\ \delta_{CA} \\ \delta_{AD} \\ \delta_{DE} \\ \delta_{EA} \end{bmatrix} \quad r := \begin{bmatrix} \tau_{AB} \\ \tau_{BA} \\ \tau_{BC} \\ \tau_{CB} \\ \tau_{CA} \\ \tau_{AC} \\ \tau_{AD} \\ \tau_{DA} \\ \tau_{DE} \\ \tau_{ED} \\ \tau_{EA} \\ \tau_{AE} \\ \epsilon_{AB} \\ \epsilon_{BC} \\ \epsilon_{CA} \\ \epsilon_{AD} \\ \epsilon_{DE} \\ \epsilon_{EA} \end{bmatrix} \quad \text{[Eq. 173]}$$

The δ equations in this case are:

$t_A - t_B = \delta_{AB}$ [Eq. 174]

$t_B - t_C = \delta_{BC}$ [Eq. 175]

$t_C - t_A = \delta_{CA}$ [Eq. 176]

$t_A - t_D = \delta_{AD}$ [Eq. 177]

$t_D - t_E = \delta_{DE}$ [Eq. 178]

$t_E - t_A = \delta_{EA}$ [Eq. 179]

Written in the connection system Γt=δ matrix form:

$$\begin{bmatrix} 1 & -1 & 0 & 0 \\ 0 & 1 & -1 & 0 \\ 0 & 0 & 1 & -1 \\ -1 & 0 & 0 & 1 \\ -1 & 0 & 1 & 0 \\ 0 & -1 & 0 & 1 \end{bmatrix} \begin{bmatrix} t_A \\ t_B \\ t_C \\ t_D \end{bmatrix} = \begin{bmatrix} \delta_{AB} \\ \delta_{BC} \\ \delta_{CD} \\ \delta_{DA} \\ \delta_{CA} \\ \delta_{DB} \end{bmatrix} \quad \text{[Eq. 180]}$$

And the usual loop closure relations can be found by deriving the augmented reduced row echelon form of [Γ|δ]. In this manner, the present method of operating calculating the required constraints and implementing them is expandable for use in a multi-mode network system for quantum-secure time transfer throughout the network.

It is noted that, in the above analyses, an assumption was made that the local clocks at the nodes in a given network all run at the same frequency, and the nodes are static with respect to each other such that the propagation times between the nodes do not change with time. While the assumption of syntonized clocks (i.e., clocks all running at the same frequency) is likely not justified in an absolute sense, clocks are generally well characterized and stringent limits on relative drift of their frequencies can be obtained. For instance, an effect of a clock drift is to make the peak of the cross-correlation function less pronounced such that, if the relative drift is too fast, the peak of the cross-correlation function may be difficult to detect from the background. However, if the peak is locatable, even with some frequency drift, then pairs of entangled photons can still be identified and the interval between successful detections can be measured such that an accurate trend of clock drift can be monitored. Thus, clock syntonization can be maintained while achieving time transfer between nodes in a secure manner.

Furthermore, while the networks illustrated in FIGS. 3-8 were assumed to be static, the method discussed above can be expanded to quantum-secure time transfer in non-static networks as well. For example, the relative motion of nodes can result in a similar effect as drifting clocks in that the cross-correlation measurement becomes "smeared" from the variation in propagation time such that a maximum cross-correlation value may be difficult to fine. However, like the clock drift, the relative motion can be measured by comparing time intervals between successive events in connected nodes such that the relative motion can also be taken into account by the controllers at the nodes.

While in principle it may be difficult to distinguish between the effects of relative motion and drifting clocks, the properties of the quantum clock synchronization network discussed herein can allow the effects of the two variables to be distinguished from each other. For instance in a two-node network, if the network is static, the roundtrip time for a photon traveling between the two nodes can be obtained by simply adding the time the photon takes to travel from node A to node B with the time the photon takes to travel from node B to node A. The network also allows a direct measurement of the roundtrip time by having node B reflect some photons originating from node A. Thus, node A is able to directly measure the roundtrip time of a photon according to the local clock at A. A concatenation of several such measurements can provide information regarding how quickly node A is moving with respect to node B, and the effect can be subtracted from other measurements to obtain the relative clock drift due to both motion and drift.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination.

In the specification, there have been disclosed embodiments of the invention and, although specific terms are employed, they are used in a generic and descriptive sense only and not for purposes of limitation. Although a few exemplary embodiments of this invention have been That which is claimed:

1. A multi-node, quantum communication network for providing quantum-secure time transfer with Damon attack detection, the network comprising:
a first node including
a first local clock,
a first photon pair source for providing a first entangled photon pair, the first entangled photon pair including first and second photons,
a first capture device for capturing the first photon at a first local time $t_1$ at the first local clock,
a first coupling mechanism for directing the second photon away from the first node,
a first measuring device for receiving photons from outside the first node, and
a first controller for controlling at least the first local clock, the first photon pair source, the first capture device, the first coupling mechanism, and the first measuring device;
a second node including
a second local clock,
a second photon pair source for providing a second entangled photon pair, the second entangled photon pair including third and fourth photons,
a second capture device for capturing the third photon at a second local time $t_2$ at the second local clock,
a second coupling mechanism for directing the fourth photon away from the second node,
a second measuring device for receiving photons from outside the second node, and
a second controller for controlling at least the second local clock, the second photon pair source, the second capture device, the second coupling mechanism, and the second measuring device;
a third node including
a third local clock,
a third photon pair source for providing a third entangled photon pair, the third entangled photon pair including fifth and sixth photons,
a third capture device for capturing the fifth photon at a third local time $t_3$ at the third local clock,
a third coupling mechanism for directing the sixth photon away from the third node,
a third measuring device for receiving photons from outside the third node, and
a third controller for controlling at least the third local clock, the third photon pair source, the third capture device, the third coupling mechanism, and the third measuring device;
a first authenticated communication channel communicatively connecting the first and second nodes;
a second authenticated communication channel communicatively connecting the second and third nodes; and
a third authenticated communication channel communicatively connecting the third and first nodes,
wherein the first, second, and third nodes and the first, second, and third authenticated communication channels form a closed loop,
wherein the first, second, and third controllers are configured
for determining differences between the first, second, and third local times,
for measuring time durations required
for the second photon to travel from the first node to the second node,
for the second photon to travel from the first node to the third node,
for the fourth photon to travel from the second node to the first node,
for the fourth photon to travel from the second node to the third node,
for the sixth photon to travel from the third node to the first node, and
for the sixth photon to travel from the third node to the second node, and
for using the differences between the first, second, and third local times and the time durations so measured to detect a Damon attack, if present.

2. The network of claim 1, wherein the first, second, and third controllers are further configured to detect the Damon attack if a closed loop condition is not satisfied.

3. The network of claim 2, wherein the closed loop condition is defined as $\delta_{12}+\delta_{23}+\delta_{31}=0$,
wherein $\delta_{12}=t_1-t_2$, $\delta_{23}=t_2-t_3$, and $\delta_{31}=t_3-t_1$.

4. The network of claim 1, wherein the first, second, and third photon pair sources are configured for generating polarization-entangled photon pairs.

5. The network of claim 1, wherein the differences between the first, second, and third local times and the time durations so measured are used for synchronizing the first, second, and third local clocks.

6. A method for determining presence of a Damon attack in a multi-node, quantum communication network for providing quantum-secure time transfer, the method comprising:
identifying a closed loop formed by at least three nodes within the network;
determining differences between local clocks of the at least three nodes;
imposing a closed loop condition on the differences so determined; and
detecting, if the closed loop condition is not satisfied by the differences so determined, presence of the Damon attack.

7. The method of claim 6, wherein imposing the closed loop condition includes, at each one of the at least three nodes,
generating an entangled photon pair, the entangled photon pair including a first photon and a second photon entangled with the first photon,
capturing the first photon at a local time for the one of the at least three nodes,
measuring a travel time for the second photon to travel from the one of the at least three nodes to another one of the at least three nodes,
calculating a difference in local time from the one of the at least three nodes to another one of the at least three nodes, and determining whether the local clock at each one of the at least three nodes is synchronized with another one of the at least three nodes.

* * * * *